US011861153B2

(12) United States Patent
Scott et al.

(10) Patent No.: US 11,861,153 B2
(45) Date of Patent: **\*Jan. 2, 2024**

(54) SIMPLIFIED SHARING OF CONTENT AMONG COMPUTING DEVICES

(71) Applicant: Google LLC, Mountain View, CA (US)

(72) Inventors: Mark David Scott, Kirkland, WA (US); Mark Alan Foltz, Seattle, WA (US); Kurt Mauro Dresner, Kenmore, WA (US); Adam Parker, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,338

(22) Filed: Nov. 3, 2022

(65) Prior Publication Data

US 2023/0049883 A1 Feb. 16, 2023

Related U.S. Application Data

(63) Continuation of application No. 16/806,434, filed on Mar. 2, 2020, now Pat. No. 11,500,530, which is a
(Continued)

(51) Int. Cl.
*G06F 3/04847* (2022.01)
*G06F 16/957* (2019.01)
(Continued)

(52) U.S. Cl.
CPC ...... *G06F 3/04847* (2013.01); *G06F 3/04842* (2013.01); *G06F 16/9577* (2019.01);
(Continued)

(58) Field of Classification Search
USPC .......................................... 715/756
See application file for complete search history.

(56) References Cited

U.S. PATENT DOCUMENTS 8,171,528 B1 * 5/2012 Brown ................. H04W 4/029
726/4
8,571,528 B1 * 10/2013 Channakeshava .. H04M 1/2757
455/414.1
(Continued)

FOREIGN PATENT DOCUMENTS

EP 2587799 5/2013
WO 2016077028 5/2016

OTHER PUBLICATIONS

ASUS, "ASUS Chromebox—Experience the Best Chrome OS Desktop," retrieved on Jun. 13, 2015, from http://promos.asus.com/us/chrome-os/chromebox/, pp. 1-5.
(Continued)

*Primary Examiner* — Reza Nabi
(74) *Attorney, Agent, or Firm* — Kilpatrick Townsend & Stockton LLP

(57) ABSTRACT

In one general aspect, a method can include displaying, on a display device included in a computing device, content in an application executing on the computing device. The method can further include displaying, in a user interface on the display device, at least one identifier, receiving a selection of the at least one identifier, and initiating casting in response to receiving the selection of the at least one identifier.

13 Claims, 17 Drawing Sheets

Related U.S. Application Data continuation of application No. 15/894,646, filed on Feb. 12, 2018, now Pat. No. 10,579,244, which is a continuation of application No. 14/540,718, filed on Nov. 13, 2014, now Pat. No. 9,891,803.

(51) Int. Cl.
*H04N 7/14* (2006.01)
*H04N 7/15* (2006.01)
*G06F 3/04842* (2022.01)
*H04L 67/02* (2022.01)

(52) U.S. Cl.
CPC ............ *H04L 67/02* (2013.01); *H04N 7/147* (2013.01); *H04N 7/15* (2013.01); *H04N 2007/145* (2013.01)

(56) References Cited

U.S. PATENT DOCUMENTS

| | | | | |
|---|---|---|---|---|
| 9,124,757 | B2* | 9/2015 | Weber | H04N 19/36 |
| 9,143,729 | B2* | 9/2015 | Anand | H04N 7/141 |
| 9,191,407 | B2* | 11/2015 | Tucker | H04L 65/1083 |
| 9,300,705 | B2* | 3/2016 | Periyannan | H04N 7/152 |
| 9,369,673 | B2* | 6/2016 | Ma | H04N 7/141 |
| 2006/0259755 | A1* | 11/2006 | Kenoyer | G06Q 10/1053 713/1 |
| 2007/0039025 | A1* | 2/2007 | Kraft | H04N 7/147 348/E7.071 |
| 2008/0307324 | A1* | 12/2008 | Westen | H04N 7/15 715/753 |
| 2010/0127064 | A1 | 5/2010 | Barnes et al. | |
| 2010/0188473 | A1* | 7/2010 | King | H04M 3/56 348/E7.083 |
| 2010/0205667 | A1* | 8/2010 | Anderson | G06F 21/84 726/19 |
| 2010/0226487 | A1* | 9/2010 | Harder | H04N 21/4436 379/202.01 |
| 2010/0268694 | A1* | 10/2010 | Denoue | G06F 16/954 707/693 |
| 2010/0302454 | A1* | 12/2010 | Epstein | G06F 3/1423 348/E5.057 |
| 2011/0025818 | A1* | 2/2011 | Gallmeier | G06F 3/0425 348/E7.083 |
| 2011/0157468 | A1* | 6/2011 | Dai | H04N 5/63 348/730 |
| 2012/0254382 | A1* | 10/2012 | Watson | H04W 64/00 709/221 |
| 2012/0304079 | A1* | 11/2012 | Rideout | H04L 12/1818 715/758 |
| 2013/0002796 | A1* | 1/2013 | Hiller | G06F 3/0485 348/E7.078 |
| 2013/0019178 | A1* | 1/2013 | Morikawa | G06F 3/017 715/731 |
| 2013/0106977 | A1* | 5/2013 | Chu | H04N 7/15 348/E7.083 |
| 2013/0191896 | A1* | 7/2013 | Adderly | H04W 4/80 709/204 |
| 2014/0028784 | A1* | 1/2014 | Deyerle | H04N 7/15 348/E7.083 |
| 2014/0222462 | A1* | 8/2014 | Shakil | G16H 10/60 705/3 |
| 2014/0237076 | A1* | 8/2014 | Goldman | H04W 4/029 709/217 |
| 2014/0313282 | A1* | 10/2014 | Ma | H04N 7/141 348/14.09 |
| 2015/0278149 | A1* | 10/2015 | Kogan | H04N 21/4402 710/52 |
| 2016/0139782 | A1* | 5/2016 | Scott | H04L 67/02 715/756 |

OTHER PUBLICATIONS

Microsoft, "Demo: Microsoft Office Live Meeting—Live Meeting," retrieved on Sep. 7, 2014, from http://office.microsoft.com/en-us/live-meeting-help/demo-microsoft-office-live-meeting-HA010240323.asp, p. 1.

Google, "Google Hangouts—Video Conferencing & Meetings for Business," retrieved on Sep. 7, 2014 from http://www.google.com/enterprise/apps/business/products/hangouts/, pp. 1-4.

Raphael, Jr., "In Depth: What Asus's $179 Chromebox is Actually Like to Use," last updated Mar. 12, 2014, from https://www.computerworld.com/article/2475973/in-depth--what-asus-s--179-chromebox-is-actually-like-to-use.html pp. 1-9.

International Search Report and Written Opinion for PCT/US2015/055945 dated Feb. 10, 2016, all pages.

* cited by examiner

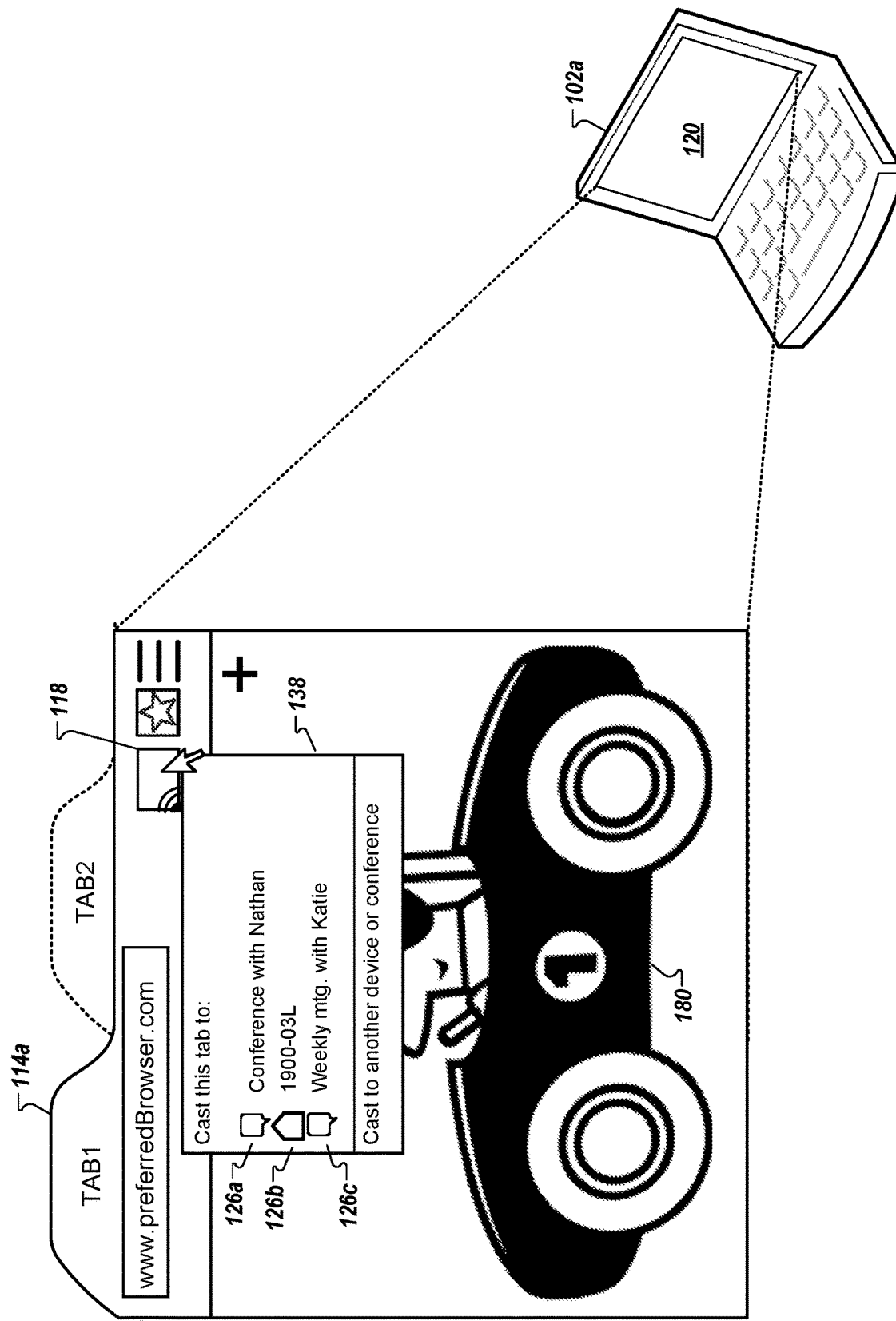

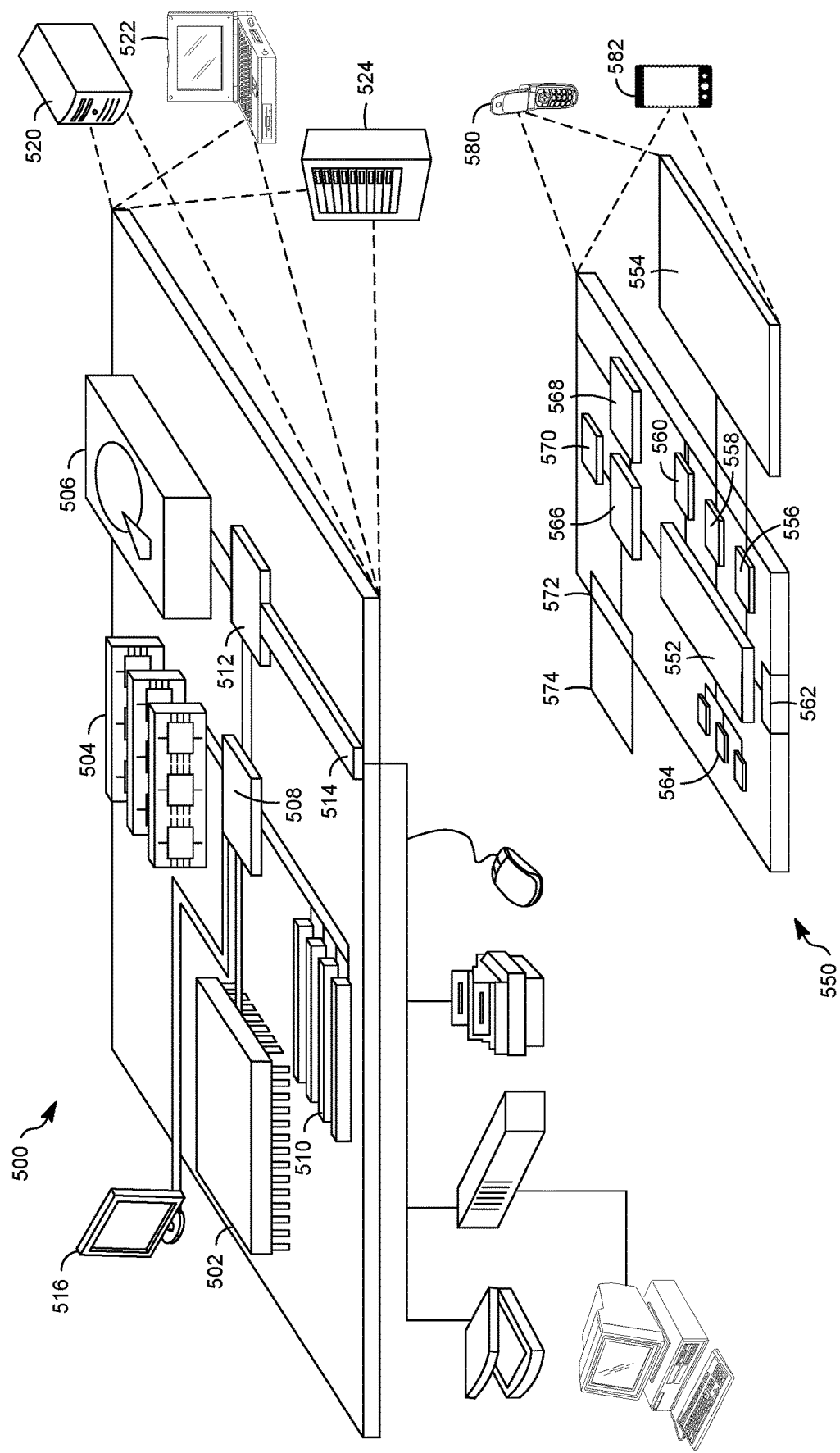

SIMPLIFIED SHARING OF CONTENT AMONG COMPUTING DEVICES

CROSS-REFERENCE TO RELATED APPLICATIONS

This application is a continuation of U.S. patent application Ser. No. 16/806,434, filed Mar. 2, 2020, which is a continuation of U.S. patent application Ser. No. 15/894,646, filed Feb. 12, 2018, which is a continuation of U.S. patent application Ser. No. 14/540,718, filed Nov. 13, 2014, each of which is incorporated by reference herein in its entirety.

TECHNICAL FIELD

This description generally relates to computing devices. The description in particular, relates to the use of computing devices for videoconferencing.

BACKGROUND

Videoconferencing systems can allow participants (users) in multiple locations to communicate simultaneously with one another using two-way video and audio transmissions. A typical requirement for a videoconferencing system, therefore, can be the ability for one or more of the participants in the videoconference to be able to project content from a computing device into the videoconference. In some cases, the host may be required to install and run specialized software (applications) on a computing device for the host. The host may also need to know how to use the specialized software and how to use it in conjunction with activating the videoconferencing system in order to schedule, setup, and run the videoconference. The host and participants can follow a series of steps in order for the host and the participants to connect to, project to, and otherwise participate in the videoconference. However, known videoconferencing systems may not provide proper or efficient access to participants.

Thus, a need exists for systems, methods, and apparatus to address the shortfalls of present technology and to provide other new and innovative features.

SUMMARY

In one general aspect, a method can include displaying, on a display device included in a computing device, content in an application executing on the computing device, determining that the computing device is proximate to a videoconferencing system, displaying, in a user interface on the display device, at least one identifier associated with a videoconference, receiving a selection of the at least one identifier, and initiating the videoconference on the videoconferencing system in response to receiving the selection of the at least one identifier such that the content is provided for display on a display device included in the videoconferencing system.

Example implementations may include one or more of the following features. For instance, determining that the computing device is proximate to the videoconferencing system can include determining that the computing device is proximate to the videoconferencing system based on a threshold distance. Determining that the computing device is proximate to the videoconferencing system can include the use of one or more of a WiFi signature, Bluetooth Low Energy (LE) technology, and an audio token. The application can be a web browser application. The content can be included in a tab of the web browser application. The tab can be displayed on the display device included in the computing device when the video conference is initiated. The tab can be a first tab, and the method can further include displaying, on the display device included in the computing device, other content in a second tab of the web browser application while continuing to provide the content included in the first tab of the web browser application for display on the display device included in the videoconferencing system. The displaying, in the user interface on the display device, the at least one identifier associated with the videoconference can include displaying a plurality of identifiers including the at least one identifier. Displaying the plurality of identifiers can include deduplicating the plurality of identifiers. The method can further include providing, by a calendar application executing on the computing device, the at least one identifier associated with the videoconference. The identifier can be a first identifier and the videoconference can be a first videoconference. The method can further include receiving a manual entry of a second identifier associated with a second videoconference; and based on receiving the manual entry of the second identifier associated with the second videoconference, the method can further include initiating the second videoconference on the videoconferencing system. The content can be included in a desktop or a window included in a plurality of windows displayed on the display device In another general aspect, a system can include a computing device including a first display device being configured to display content in an application executing on the computing device, and determine that the computing device is proximate to a videoconferencing system. The system can further include a videoconferencing system including a videoconferencing device and a second display device, the computing device being configured to automatically initiate a videoconference on the videoconferencing system, and the videoconferencing device being configured to receive the content from the computing device for display on the second display device.

Example implementations may include one or more of the following features. For instance, the videoconferencing system can further include a camera and a microphone. The videoconferencing system can be configured to disable the camera and the microphone when the videoconference is initiated on the videoconferencing system. Determining that the computing device is proximate to the videoconferencing system can include determining that the computing device is located in the same room as the videoconferencing system. Determining that the computing device is proximate to the videoconferencing system can include the use of one or more of a WiFi signature, Bluetooth Low Energy (LE) technology, and an audio token.

In yet another general aspect, a non-transitory, machine-readable medium having instructions stored thereon, the instructions, when executed by a processor, can cause a computing device to display, on a display device included in a computing device, content in an application running on the computing device, receive a selection of a videoconferencing icon included in the application, display, in a user interface on the display device, at least one identifier associated with a videoconference included in a calendar associated with a user of the computing device, receive a selection of the at least one identifier, and initiate the videoconference on a videoconferencing system in response to receiving the selection of the at least one identifier such that the content is provided for display to the user on a display device included in the videoconferencing system.

Displaying, in a user interface on the display device, at least one identifier associated with a videoconference can include displaying a plurality of identifiers including the at least one identifier. Displaying the plurality of identifiers can include deduplicating the plurality of identifiers. The application can be a videoconferencing-enabled application. The computing device can be one of a desktop computer, a laptop computer, a tablet computer, and a smart phone.

The details of one or more implementations are set forth in the accompanying drawings and the description below. Other features will be apparent from the description and drawings, and from the claims.

BRIEF DESCRIPTION OF THE DRAWINGS

FIG. 1C shows an example of a pull-down menu that can display indications of information and data determined by discovery APIs and provided by a server to a computing device.

FIG. 5 shows an example of a computer device and a mobile computer device that can be used to implement the techniques described here.

Like reference symbols in the various drawings indicate like elements.

DETAILED DESCRIPTION

Figure 1A:
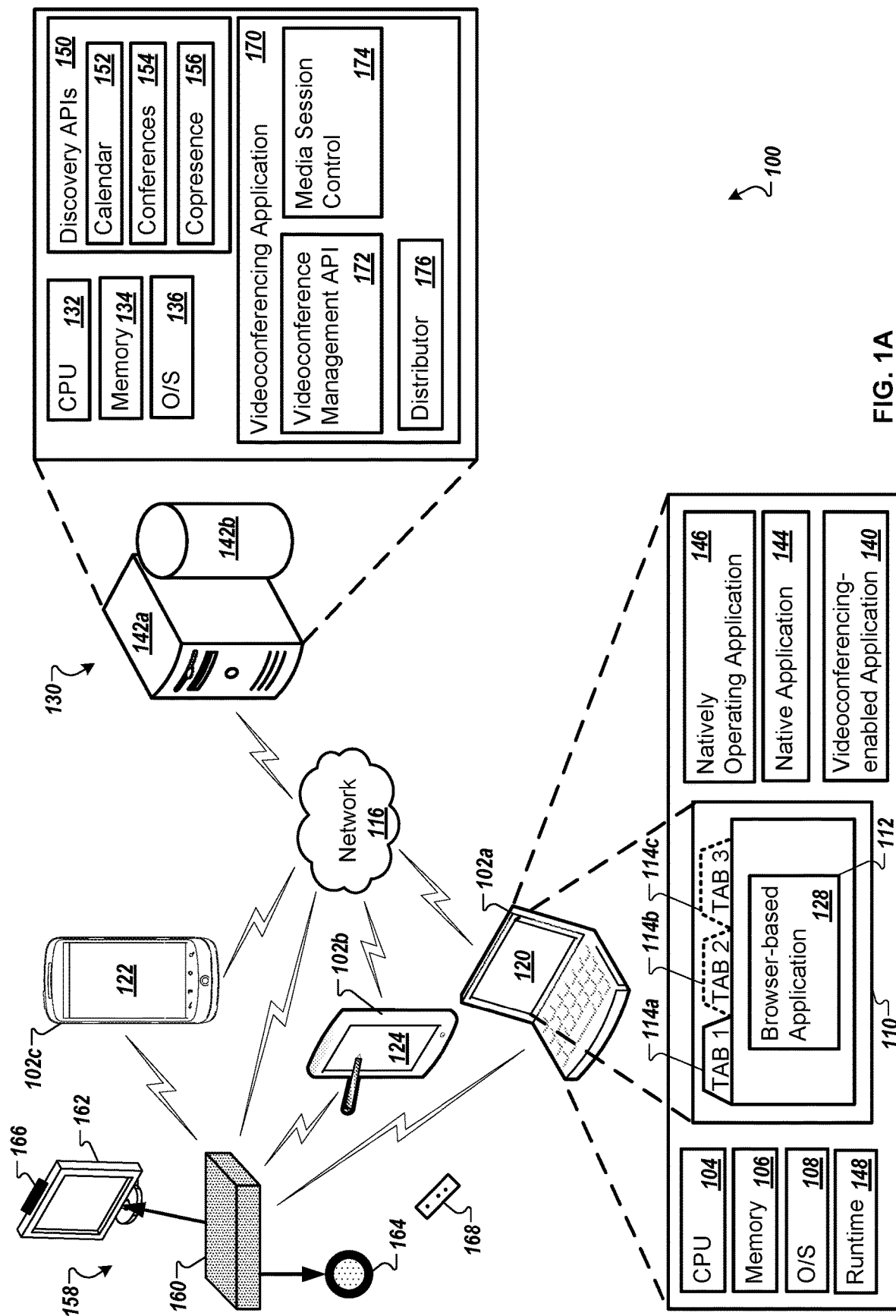
FIG. 1A is a block diagram of an example system that can be used for videoconferencing.

A videoconference connection and participation process can provide a level of access control to a videoconference. In some cases, this level of access control may be desirable when the information to be discussed during the videoconference is highly sensitive and confidential.

A desired feature for a videoconferencing system can be the ability for one or more participants in the videoconference to project content from respective computing devices into the videoconference without requiring a multitude of complicated authentication steps for allowing the participant access to the videoconference using the respective computing device. For example, multiple users can be sitting in a conference room that includes a videoconferencing system. Each of the multiple users can have a one or more computing devices along with them in the conference room. The computing devices can include, but are not limited to, desktop computers, laptop computers, tablet computing devices, smartphones, and personal digital assistants. One or more features can be incorporated into videoconferencing systems and applications that can simplify the process of setting up, scheduling, connecting to and providing/projecting content into a videoconference.

In some implementations, each computing device may not have information about a context for the videoconference. A user (e.g., a videoconference host) can follow a series of steps in order to establish a context about the videoconference. For example, the context can include establishing, by a user using a computing device, a unique identifier (e.g., a Universal Resource Locator (URL)) for the meeting. This user can be considered the host of the videoconference and can distribute the information about the videoconference to the other videoconference participants (share the unique identifier for the meeting with the other videoconference participants). An example of these implementations is described with reference to FIGS. 2A-F.

In some implementations, a computing device can establish a context for the videoconference based on a detected proximity of the computing device to the videoconferencing system. For example, a videoconferencing system can detect approximate proximity of each respective computing device for the users sitting in a conference room that includes the videoconferencing system. For example, the videoconferencing system can detect the approximate proximity of each respective computing device using technologies such as Wi-Fi beacons or Bluetooth communication protocols. The videoconferencing system can confirm a physical co-location of a computing device of a user with the videoconferencing system based on the detected proximity (e.g., based on a threshold distance) of the computing device to the videoconferencing system.

In some implementations, the basis of the authentication on the detected proximity can be that the computing device is within a threshold distance of the videoconferencing system. In some implementations, the basis of the authentication on the detected proximity can be that the computing device is within a communication range of a particular communication protocol. In some implementations, the basis of the authentication on the detected proximity can be that the computing device is in the same room as the videoconferencing system. In some implementations, the computing device of a second user being within a threshold distance or within a communication range of a particular communication protocol to a computing device of a first user that is already authenticated to the videoconferencing system can result in the authentication of the second user to the videoconferencing system.

This automatic authentication process can eliminate the need for a manual authentication process that may involve multiple steps and the need for a unique identifier to be established and provided by a host for the videoconference. In effect, any authenticated user can project content for a respective computing device into the videoconference. An example of these implementations and the authentication processes are described with reference to at least FIGS. 2A-D.

In some implementations, one or more users can participate in the videoconference from a location remote from the location of the videoconferencing system. For example, a participant can be located outside of the conference room that includes the videoconferencing system. The participant can be located in an office, at home, or in a hotel room, for example. In some cases, the remote user may be provided with information (e.g., a URL) for accessing the videoconference along with any additional authentication information (e.g., a password or pass code) that may be needed to authenticate the user for access to the videoconference. In some cases, the remote user can access an application running on a computing device that can provide an identifier for the videoconference that the user can select in order to remotely join (and project content into) the videoconference. An example of these implementations is described with reference to FIGS. 2A-F.

In some cases, one of the users may be the host of the videoconference. The host can perform the necessary steps for activating the videoconferencing system, and for providing information needed by the other users so that they can connect to and participate in the videoconference using a respective computing device. In some cases, the computing device for the host can project (provide) content to the videoconferencing system. In these cases, the computing device for the host can be considered a projecting device. The content can be displayed on a display device (e.g., a high definition television (HDTV)) included in the videoconferencing system. In addition, the content can include audio content the videoconferencing system can process and output, for example, to one or more speakers included in the videoconferencing system. The content can then be viewed by/heard by the multiple users located in the conference room. Once a user joins the videoconference, the computing device of the user can also project (provide) content to the videoconferencing system. FIGS. 2A-I describe setting up, joining, and participating in a videoconference by multiple users in more than on location. In other cases, any of the participants in a videoconference can use a computing device to project (provide) content to the videoconferencing system.

In some implementations, multiple users may gather in a conference room that includes an idle videoconferencing system. One or more of the multiple users may have with them a respective computing device. A user may want to use the display device included in the videoconferencing system to display information (content) from the computing device that the user would like to share with the other users located in the conference room. However, the user does not want to activate a camera and a microphone included in the videoconferencing system (e.g., for security and confidentiality reasons). In these implementations, the user can access an application running on a computing device that can provide an identifier for the idle videoconferencing system. The user can select the idle videoconferencing system as a target display device in order to display content from the computing device to the display device of the videoconferencing system while deactivating the camera and the microphone included in the videoconferencing system. An example of these implementations is described with reference to FIGS. 3A-C.

FIG. 1A is a block diagram of an example system 100 that can be used for videoconferencing. The example system 100 includes a plurality of computing devices 102a-c (e.g., a laptop computer, a tablet computer, and a smart phone, respectively). An example computing device 102a (e.g., a laptop or notebook computer) can include one or more processors (e.g., client central processing unit (CPU) 104) and one or more memory devices (e.g., client memory 106)). The computing device 102a can execute a client operating system (O/S) 108 and one or more client applications (e.g., a web browser application 110) that can display a user interface (UI) (e.g., web browser UI 112) on a display device 120 included in the computing device 102a. Though not shown in FIG. 1A, the computing devices can also include a desktop computing device.

The system 100 includes a computer system 130 that can include one or more computing devices (e.g., server 142a) and one or more computer-readable storage devices (e.g., database 142b). The server 142a can include one or more processors (e.g., server CPU 132), and one or more memory devices (e.g., server memory 134). The computing devices 102a-c can communicate with the computer system 130 (and the computer system 130 can communicate with the computing devices 102a-c) using a network 116. The server 142a can execute a server 136.

The system 100 includes a videoconferencing device 160. The computing devices 102a-c can interface to/communicate with the videoconferencing device 160 using the network 116. Similarly, the videoconferencing device 160 can interface to/communicate with the computing devices 102a-c. The videoconferencing device 160 can communicate with the computer system 130 using the network 116. Similarly, the computer system 130 can communicate with the videoconferencing device 160 using the network 116. The videoconferencing device 160 is included in a videoconferencing system 158 that can include a display device 162, a microphone 164, a camera 166, and a remote control 168.

In some implementations, the computing devices 102a-c can be laptop or desktop computers, smartphones, personal digital assistants, portable media players, tablet computers, or other appropriate computing devices that can communicate, using the network 116, with other computing devices or computer systems. In some implementations, the computing devices 102a-c can perform client-side operations, as discussed in further detail herein. Implementations and functions of the system 100 described herein with reference to computing device 102a, may also be applied to computing device 102b and computing device 102c and other computing devices not shown in FIG. 1 that may also be included in the system 100. The computing device 102b includes a display area 124. The computing device 102c includes a display area 122.

In some implementations, the computer system 130 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server and a web crawler server.

In some implementations, the network 116 can be a public communications network (e.g., the Internet, cellular data network, dialup modems over a telephone network) or a private communications network (e.g., private LAN, leased lines). In some implementations, the computing devices 102a-c can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the web browser application 110 can include or be associated with one or more browser-based applications (e.g., browser-based application 128). The browser-based application 128 can be executed/interpreted by the web browser application 110. The browser-based application 128 executed by the web browser application 110 can include code written in a scripting language, such as, JavaScript, VBScript, ActionScript, or other scripting languages.

A browser-based application may be configured to perform a single task or multiple tasks for a user. In such an implementation, the browser-based application may be configured to be executed or interpreted by the web browser. This is compared with the native applications (e.g., native application 144) that include machine executable code and are configured to be executed directly via the operating system of the client device, whereas, a browser-based application may be incapable of execution or display without the aid of the web browser. Thus, browser-based applications can be run inside a browser with a dedicated user interface, and can provide functionality and an experience that is more rich and interactive than a standalone website but are less cumbersome and monolithic than a native application 144. Examples of browser-based applications include, but are not limited to, games, photo editors, and video players that can run inside the web browser application 110. The browser-based application 128 can provide a dedicated UI for display on the display device 120.

Browser-based applications can be "hosted applications" or "packaged applications." Hosted applications may include at least a portion of a web site that itself includes web pages, in addition to some metadata that may be especially pertinent to the browser-based application or to the user of the browser-based application to allow the browser-based application to perform some particular functionality for the user. Packaged applications can be thought of as browser-based applications whose code is bundled, so that the user can download all of the content of the browser-based application for execution by the browser. A packaged browser-based application may not need to have network access to perform its functionality for the user, and rather may be executed successfully by the browser locally on the computing device without access to a network. Packaged browser-based applications have the option of using Extension APIs, allowing packaged applications to change the way the browser behaves or looks.

In some implementations, the computing device 102a can run, or cause the operating system 108 to execute, the web browser application 110. The web browser application 110 can then provide, in the web browser UI 112, a plurality of panes or tabs 114a-c. The web browser UI 112 can be a visual area, usually rectangular, containing some kind of user interface. In a graphical user interface (GUI) used in the computing device 102a, the web browser UI 112 can be a two-dimensional object arranged on a plane of the GUI known as a desktop. The web browser UI 112 can include other graphical objects (e.g., a menu-bar, toolbars, controls, icons). The web browser UI 112 can display the graphical objects on the display device 120. A user of the computing device 102a can interact with the graphical objects to provide input to, or otherwise control the operation of, the web browser application 110.

The web browser UI 112 can include a working area in which a document, an image, folder contents, or other objects including information or data for the browser-based application 128 can be displayed. The working area can include one main object (e.g., a single web document interface) or multiple objects (e.g., more than one web document interface), where each object can be displayed in a separate window (or tab). Each tab can include a UI. In some applications, specifically web browser applications, multiple documents can be displayed in individual tabs 114a-c. The tabs 114a-c can be displayed one at a time, and are selectable using a tab-bar, which can reside above the contents of an individual window. That is, one selected tab (e.g., tab 114a) can be considered forward-facing (in the foreground). The tab 114a can display information or content to a user in the web browser UI 112, while the content of other tabs 114b, 114c can be considered "hidden" (in the background).

A natively operating application 146 can be an application that is coded using only web technology (defined here as code that can be implemented directly by a web browser application), such as JavaScript, ActionScript, HTML, or CSS. For example, the computing device 102a can download and install the natively operating application 146 from a marketplace server using a web browser application (e.g., web browser application 110). The natively operating application 146 may operate using a runtime 148. The natively operating application 146 may be configured to be executed directly by the CPU 104 or by the O/S 108, using a runtime 148, for example. Because natively operating application 146 is coded using web technologies, no compilation step is required.

In some implementations, the computing devices 102a-c can communicate directly with the videoconferencing device 160 using, for example one or more high-speed wired and/or wireless communications protocols such as Bluetooth, Bluetooth Low Energy (Bluetooth LE), and WiFi. The videoconferencing device 160 can use the direct communication to identify one or more computing devices that are in proximity to the videoconferencing device 160. In these implementations, identifying the one or more computing devices that are in proximity to the videoconferencing device 160 includes determining that the one or more computing devices are within a communication range of the communication protocol.

In some implementations, the videoconferencing device 160 can use short-range communications to "listen" for broadcasts from short-range communication enabled computing devices (e.g., the computing devices 102a-c). For example, the short-range communication can use Bluetooth LE when transmitting and receiving broadcasts. The videoconferencing device is determined to be in proximity to the computing device when the computing device and the videoconferencing device are within the range of the short-range communication system (e.g., are within the range of Bluetooth LE).

In some implementations, the system 100 can use WiFi scans, WiFi signal strength information, or WiFi signature matching to determine proximity of a WiFi-enabled computing device to the videoconferencing device 160. For example, the WiFi-enabled computing device can capture a signal strength of a WiFi signal received from the videoconferencing device 160. The captured strength of the signal can be indicative of a distance between the videoconferencing device 160 and the computing device and can be referred to as a received signal strength indicator (RSSI). A copresence application processing interface (API) 156 included in discovery APIs on the server 142a can determine that the captured strength of the signal is within a range indicative of an acceptable proximity of the computing device to the videoconferencing device 160. For example, the range (e.g., threshold range) can be stored in the memory 134.

In another example, the copresence API 156 can use a set of captured signal strengths for sampled reference locations with respect to the videoconferencing device 160 to determine if a WiFi-enabled computing device is proximate to the videoconferencing device 160. The captured signal strengths for the sampled reference locations with respect to the videoconferencing device 160 can comprise a database of signal strength signatures for the location of the videoconferencing device 160. For example, the signal strength signatures can be stored in the database 142b. The WiFi-enabled computing device can capture a signal strength of a WiFi signal received from the videoconferencing device 160 (a signal strength signature for the location of the WiFi-enabled computing device). The copresence API 156 can compare the captured signal strength to the signal strength signatures stored in the database 142b to determine a closest match or matches. The copresence API 156 can use the determined closest match or matches to determine the proximity of the WiFi-enabled computing device to the videoconferencing device 160.

In some implementations, the system 100 can use an audio token to determine proximity of a computing device to the videoconferencing device 160. The system can use the audio token in addition to (or as an alternative to) one or more of the short-range communications, the WiFi location tracking and the WiFi signature matching when determining proximity of a computing device to the videoconferencing device 160. For example, the videoconferencing device 160 can receive a digitized version of an audio token from the computer system 130 by way of the network 116. In some implementations, the database 142b can store the digitized version of the audio token. In some implementations, the memory 134 can store the digitized version of the audio token. The videoconferencing device 160 can send/emit the audio token using one or more speakers included in the videoconferencing system 158. Any (or all) of the computing devices 102a-c can receive/pick up the audio token. For example, the recipient computing device (e.g., computing device 102a) can receive/pick up the audio token and send a digitized version of the received audio token to the computer system 130 using the network 116.

The copresence API 156 can verify/confirm that the audio token sent to the computer system 130 from the computing device (e.g., computing device 102a) was the actual audio token sent by the videoconferencing device 160. The audio token confirmation can be used along with/in addition to short-range communications, WiFi location tracking using an RSSI or WiFi signature matching to determine and confirm the proximity of the computing device (e.g., computing device 102a) to the videoconferencing system (e.g., the videoconferencing device 160). Once proximity is determined, a user of the computing device (e.g., computing device 102a) can participate in/join a videoconference that is using and/or being conducted by or hosted by the videoconferencing system (e.g., the videoconferencing device 160).

In some implementations, the copresence API 156 can use functions that yield an identifier for the videoconferencing device 160. A videoconference management API 172 included in the server 142a can use the identifier to communicate with the videoconferencing device 160 in order to query a status of the videoconferencing device 160 and obtain an indicator associated with the conference (e.g., a name for the conference) that the videoconferencing device 160 is being used in. In some implementations, the copresence API 156 can determine if the videoconferencing device 160 is already participating in or hosting a conference. In these cases, the copresence API 156, when confirming the proximity of the WiFi-enabled computing device to the videoconferencing device 160, can provide a user of the WiFi-enabled computing device the indicator associated with the conference (e.g., a name for the conference) in the web browser UI 112.

A conferences API 154 can determine/discover one or more conferences that a user of a computing device is currently participating in and/or invited to participate in. For example, the computing device 102a can access the conferences API 154 included in the server 142a using the network 116. A user of the computing device 102a can interact with the conferences API 154 to schedule, setup, start, or join a conference (e.g., a videoconference).

A calendar API 152 can provide information and data about one or more conferences that a user of a computing device (e.g., the computing device 102a) may have scheduled and included as calendar entries in a calendar associated with the user. The calendar API 152 can provide the user of the computing device (e.g., the computing device 102a) an indicator associated with the conference (e.g., a name for the conference) for each of the one or more scheduled conferences in the web browser UI 112.

The server 142a can include a videoconferencing application 170 that includes a videoconference management API 172, a media session control 174, and a distributor 176. The videoconference management API 172 can provide a signaling interface for a videoconferencing platform or client running in a web browser application (e.g., the web browser application 110). The videoconference management API 172 can provide a signaling interface for a videoconferencing-enabled application 140 running on the computing device 102a. The videoconferencing client and/or the videoconferencing-enabled application 140 can communication with and interface to the videoconferencing application 170.

A media session control 174 can provide a media signaling channel between the videoconference management API 172 and the videoconferencing client. The media session control 174 can provide a media signaling channel between the videoconference management API 172 and the videoconferencing application 170.

A distributor 176 can transform and distribute the media stream provided by a computing device (e.g., the computing device 102a) participating in a videoconference to the videoconferencing device 160 and to other computing devices that may also be participating in the videoconference, where the other computing devices can be located remote from the videoconferencing device 160 (e.g., the other computing devices are located outside of a room or designated area where the videoconferencing device 160 resides). For example, the distributor 176 can identify one or more elements of the media stream that can be sent to each computing device participating in a videoconference based on bandwidth and capabilities of each computing device. A display device included in the remote computing device can display the video content of the media stream received by a remote computing device. An audio processor included in the remote computing device can receive the audio content of the media stream. The audio processor can provide the audio content to one or more speakers that are included in the remote computing device.

Figure 1B:
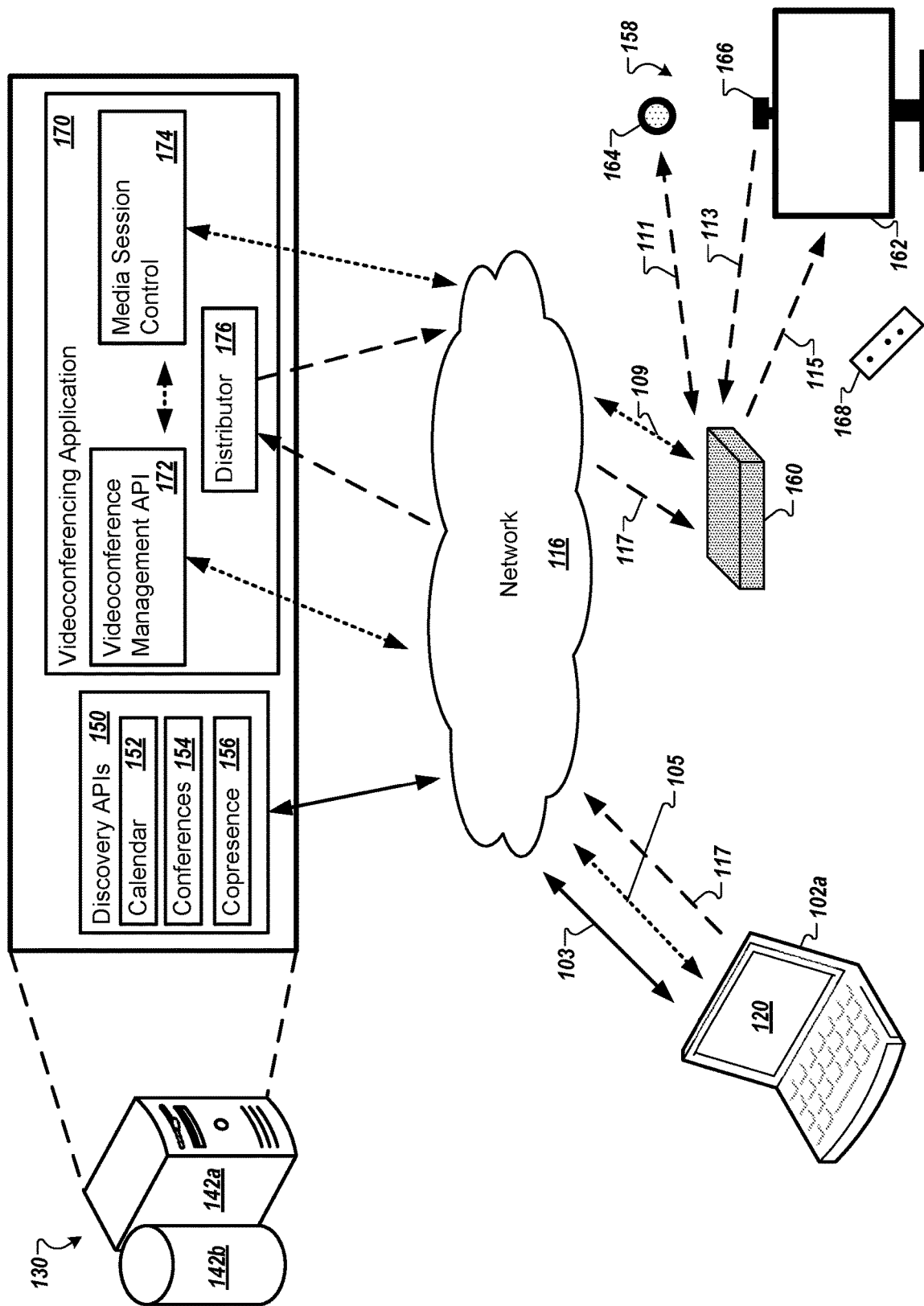
FIG. 1B is a block diagram showing an example flow of procedure calls, signals, and media in the example system shown in FIG. 1A.

FIG. 1B is a block diagram showing an example flow of procedure calls, signals, and media in the example system 100 shown in FIG. 1A. For example, referring to FIG. 1B and FIG. 1A, a user of the computing device 102*a* requests information about videoconferencing.

FIG. 1C shows an example of a pull-down menu 138 that can display indications of the information and data determined by the discovery APIs 150 and provided by the server 142*a* to the computing device 102*a* in response to the remote procedure calls 103.

The computing device 102*a* can send/provide the information and data (content) displayed in the web browser UI 112 of a particular tab (e.g., tab 114*a*) to the videoconferencing device 160 for display on a display device 162 included in the videoconferencing system 158. The videoconferencing device 160 can display the content on the display device 162 during the videoconference.

In some implementations, a user can run the videoconferencing-enabled application 140 on the computing device 102*a*. The videoconferencing-enabled application 140 can display content on the display device 162 of the videoconferencing system 158 during the videoconference directly from one or more servers without the content needing to be first downloaded to the computing device 102*a* and then encoded in real-time as a video stream.

In some implementations, a web browser application (e.g., the web browser application 110) can provide or "cast" a first tab or page of the web browser application (e.g., the tab 114*a*). In some implementations, the web browser application can include an extension that runs in the web browser application where the extension provides a user interface (e.g., web browser UI 112) for initiating and controlling the casting of the first tab. In some implementations, the web browser application can provide a user interface (e.g., web browser UI 112) for initiating and controlling the casting of the first tab. In addition, for example, a Web Real-Time Communication (WebRTC) application program interface (API) can be used for browser-based real-time communications.

A user of the computing device 102*a* can provide or "cast" the first tab (e.g., the tab 114*a*) for viewing on the display device 162 of the videoconferencing device 160 using the user interface (e.g., web browser UI 112) provided by the web browser application or the web browser application extension.

In some implementations, a videoconferencing client interfaces with the web browser application 110. A user can select a videoconferencing icon 118 included in the web browser application 110 to project (provide) content requested by the videoconferencing-enabled application 140 to the videoconferencing system 158. The videoconferencing client makes/performs remote procedure calls 103 to the discovery APIs 150 by way of the network 116.

In some implementations, a videoconferencing client can be part of/included in an application (e.g., the videoconferencing-enabled application 140). The user of the computing device 102*a* can launch/run the application. A user interface for the application can include a videoconferencing icon that when selected can project (provide) content requested by the videoconferencing-enabled application 140 to the videoconferencing system 158. In some cases, the user of the computing device 102*a* and the other participants in a videoconference can see different views. For example, the other participants in the videoconference can view content requested by the videoconferencing-enabled application 140 on the display device 162 of the videoconferencing system 158 (e.g., a bar graph showing sales data) while the user of the computing device 102*a* can be viewing other content (e.g., speaker notes about the sales data).

Whether by a native application or by a web browser application, the discovery APIs 150 included in the server 142*a* can determine/discover one or more available videoconferencing options for a user. For example, the copresence API 156 can determine/discover videoconferencing systems proximate to the computing device 102*a* (e.g., the videoconferencing device 160). The calendar API 152 can identify one or more scheduled conferences included in a calendar associated with the user of the computing device 102*a*. The conferences API 154 can identify one or more conferences that the user of the computing device 102*a* may be currently participating in and/or that the user may be invited to participate in.

The computing device 102*a* can display the pull-down menu 138 on the display device 120 in response to receiving a selection of the videoconferencing icon 118. Menu entry 126*a* included in the pull-down menu 138 is indicative of a conference that the user of the computing device 102*a* may be currently participating in and/or invited to participate in. Menu entry 126*b* is indicative of a videoconferencing system that the copresence API 156 has determined is in proximity to the computing device 102*a* (e.g., in proximity to the videoconferencing device 160). Menu entry 126*c* is indicative of a calendar entry for a conference where the calendar entry is in a calendar associated with the user of the computing device 102*a*. The example pull-down menu 138 can be displayed, as shown in FIG. 1A, in the tab 114*a* of the web browser application 110. In implementations where a videoconferencing client is part of/included in an application, a pull-down menu similar to the pull-down menu 138 can also be displayed in a user interface of the application. The menu entries 126*a-c* can be considered identifiers for respective meetings and/or videoconferences.

The user can select one of the menu entries 126*a-c* in order to project (provide) content to the videoconferencing system 158. For example, the user can select menu entry 126*b* in order to project (provide) content to the videoconferencing system 158. The computing device 102*a* makes one or more remote procedure calls 103 to the discovery APIs 150 in order to determine and authenticate the proximity of the computing device 102*a* to the videoconferencing device 160 as described with reference to FIG. 1A.

As shown in FIG. 1C and referring to FIGS. 1A and 1B, the user can be running a browser-based application (e.g., the browser-based application 128) that displays a car image 180 (as an example image) in the tab 114*a*. By selecting the videoconferencing icon 118 while the car image 180 is displayed in the tab 114*a*, the computing device 102*a*, once authenticated to access the videoconferencing device 160 and participate in a videoconference hosted by/provided by the videoconferencing device 160, can present, provide, cast, or capture and mirror the information and data included in the tab 114*a* (e.g., the car image 180) to the videoconferencing device 160. The videoconferencing system 158 can display the information and data included in the tab 114*a* (e.g., the car image 180) on the display device 162.

In some implementations, for example, a user can be running an application (e.g., the native application 144 or the natively operating application 146) that streams audio and video content to the display device 120 of the computing device 102*a*. The user can select a videoconferencing icon that can be displayed in a user interface of the application. The selection of the videoconferencing icon can launch a videoconference client that is included in or that is part of the application. The computing device 102a, once authenticated to a access the videoconferencing device 160 and participate in a videoconference hosted by/provided by the videoconferencing device 160, can present, provide, cast, or capture and mirror the streaming audio and video content to the videoconferencing device 160. The videoconferencing system 158 can provide the video content to the display device 162 and can provide the audio content to one or more speakers included in the videoconferencing system 158.

In some implementations, a user can choose to present, provide, cast, or capture and mirror the contents of the desktop displayed on the display device 120 included in the computing device 102a to the videoconferencing device 160. In some implementations, the application may allow the user to select a window from a plurality of windows displayed on the display device 120 of the computing device 102a to present, provide, cast, or capture and mirror to the videoconferencing device 160.

Referring to FIG. 1B, for example, the computing device 102a can provide a signal 105 to and receive a signal 105 from the videoconference management API 172 using the network 116. The videoconference management API 172 can provide a signaling interface for the videoconference client. The videoconference management API 172 can provide a signal 107 to and receive a signal 107 from the media session control 174 in order to open/establish a media signaling channel between the videoconference management API 172 and the videoconference client. The media session control 174 can provide a signal 109 to and receive a signal 109 from the videoconferencing device 160 using the network 116 in order to open/establish a media signaling channel between the videoconference management API 172 and the videoconferencing device 160.

The computing device 102a can provide a media stream 117 that includes the information and data (content) for use by the videoconferencing device 160 to the distributor 176 included in the server 142a by way of the network 116. As described, the content can include image or streaming video data for display on the display device 162 and, in some cases, audio data for output on one or more speakers included in the videoconferencing system 158. The distributor 176 provides the media stream 117 that includes the image data (and in some cases the audio data) to the videoconferencing device 160 by way of the network 116. The videoconferencing device 160 provides the media stream 117 that includes the image data to the display device 162. In some cases, the videoconferencing device 160 provides the media stream 117 that includes the audio data to the one or more speakers included in the videoconferencing system 158.

For example, the computing device 102a can provide videoconferencing control messages (commands and data) to the videoconferencing device 160 using the media signaling channel. The control messages can include, but are not limited to, render zoom, enable/disable muting, and pause/restart media stream. The render zoom control message can cause the videoconferencing device 160 to control the zooming of the image displayed on the display device 162 by controlling the content of a media stream 115 provided to the display device 162. The render muting control message can cause the videoconferencing device 160 to mute/unmute audio content of the videoconference by controlling a media stream 111 provided to one or more speakers and/or received from the microphone 164. In cases where the information and data (content) for use by the videoconferencing device 160 is streaming video and/or audio content, the pause/restart media stream message can cause the videoconferencing device 160 to pause and restart streaming content by pausing and restarting the media stream 115 provided to the display device 162 and by pausing and restarting the media stream 111 provided to one or more speakers included in the videoconferencing system 158. The camera 166 can provide video content 113 to the videoconferencing device 160.

In some implementations, the network 116 can be a local area network (LAN). The computing device 102a, the server 142a, and the videoconferencing device 160 can communicate using the LAN. In these implementations, based on the use of the LAN, the quality of the media stream 117 may be greater than if one or more of the computing device 102a, the server 142a, and the videoconferencing device 160 were not connected to the LAN, but to another network (e.g., the Internet).

In some implementations, the entries included in a pull-down menu displayed to a user of a computing device in response to selection of a videoconferencing icon by the user can be determined based on a sign-in status of a user. For example, a domain can be associated with a videoconference. The domain can be represented using a domain name that identifies a network resource or web site. If a user is signed into a first domain using a first user account, the entries included in the pull-down menu can be indicative of conferences associated with the first domain and of videoconferencing systems associated with the first domain. In addition, or in the alternative, the entries included in the pull-down menu can be indicative of calendar entries associated with the first user account on the first domain. If a user has multiple user accounts on the first domain, signing into a second user account on the first domain can result in displaying entries included in the pull-down menu that can be indicative of calendar entries associated with the second user account on the first domain. If a user signs into a second domain, the entries included in the pull-down menu will be indicative of conferences associated with the second domain and of videoconferencing systems associated with the second domain. In addition, or in the alternative, the entries included in the pull-down menu can be indicative of calendar entries associated with the user account on the second domain.

In some implementations, a user may be signed into multiple user accounts at the same time that are on different domains. In some cases, when the user attempts to create/join a conference, the first account that matches the domain of the conference will be used to join the conference. In some cases, when the user attempts to create/join a conference, the user may be prompted to select which of the multiple accounts they would like to use when creating/joining a conference. In some cases, if the user has no accounts in a domain, a display device included in a computing device can display a user interface to confirm an account that should be used to create/join a conference. For example, a user may have a work user account and a personal user account. The user may select the work user account when creating/joining a conference for work. The user may select the personal user account when creating/joining a conference for personal use.

In some cases, a user may not be a member of a domain (or may not be signed into a domain) associated with a videoconference. The user may want to present, provide, cast, or capture and mirror content on a computing device of the user to the videoconference. In these cases, in order for the user to be able to provide content to the videoconference, a user can initiate "knocking". For example, a user computing device can send a request message to a host (or presenter) computing device (a computing device of a host of or a presenter in the videoconference). The host computing device can present, provide, cast, or capture and mirror content to the videoconference. The host computing device can receive the request message and display the request message to the host. The host can approve the request and the host computing device can send an approval message to the user computing device. Once the approval message is received, the user computing device can present, provide, cast, or capture and mirror content on the user computing device to the videoconference.

Figure 2A:
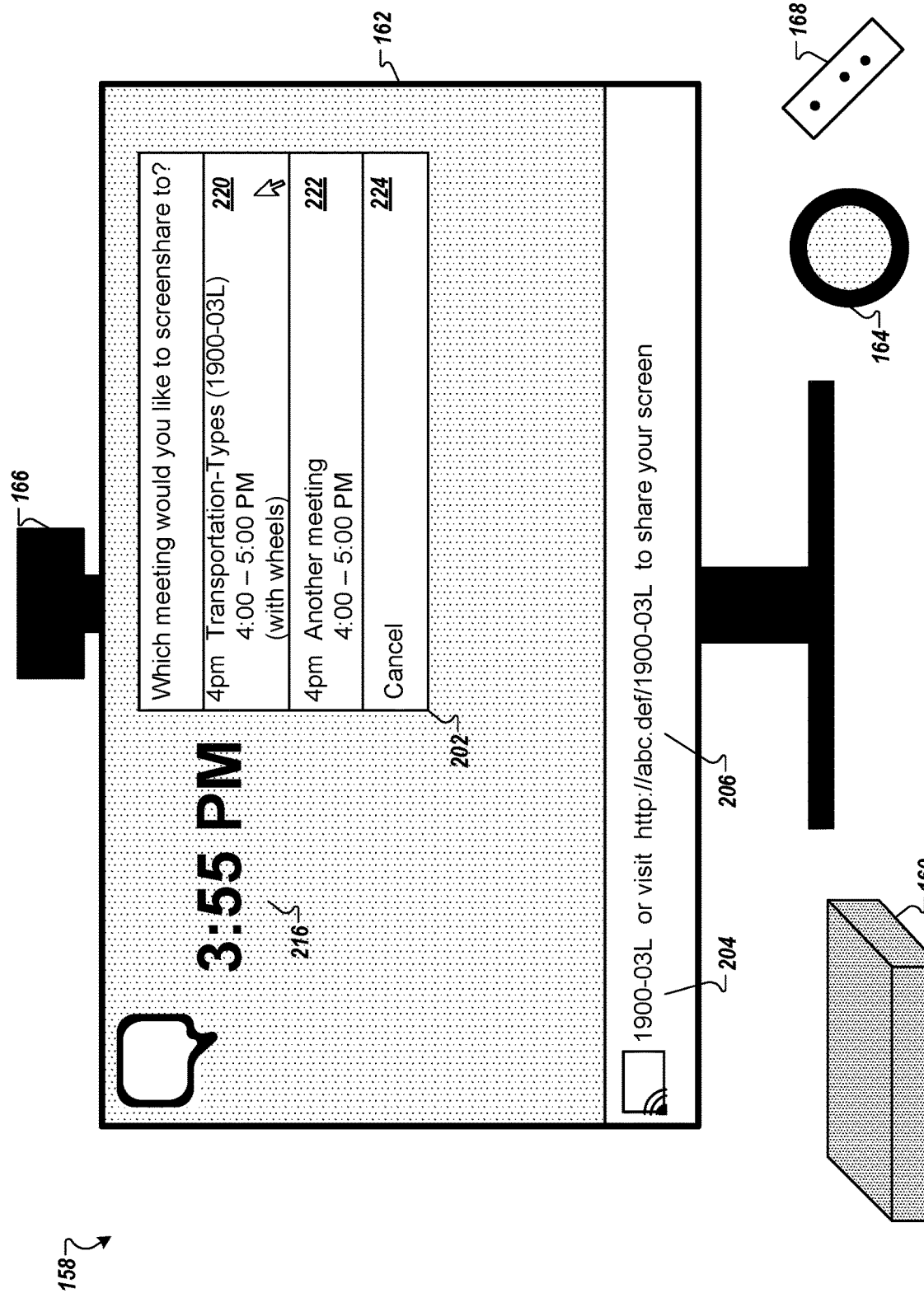
FIG. 2A is a diagram that shows an example user interface on a display device included in a videoconferencing system.

FIG. 2A is a diagram that shows an example user interface (UI) 202 on a display device (e.g., the display device 162) included in a videoconferencing system (e.g., the videoconferencing system 158). Also displayed on the display device 162 is a current time 216. One or more users (participants) who would like to participate in a meeting can enter a conference room where the videoconferencing system 158 is located at approximately 3:55 pm and see the UI 202 displayed on the display device 162. The UI 202 provides indications of one or more meetings that are scheduled for the conference room that one or more of the users can choose to participate in (e.g., provide content to as described above with reference to FIGS. 1A, 1B, and 1C).

Figure 2B:
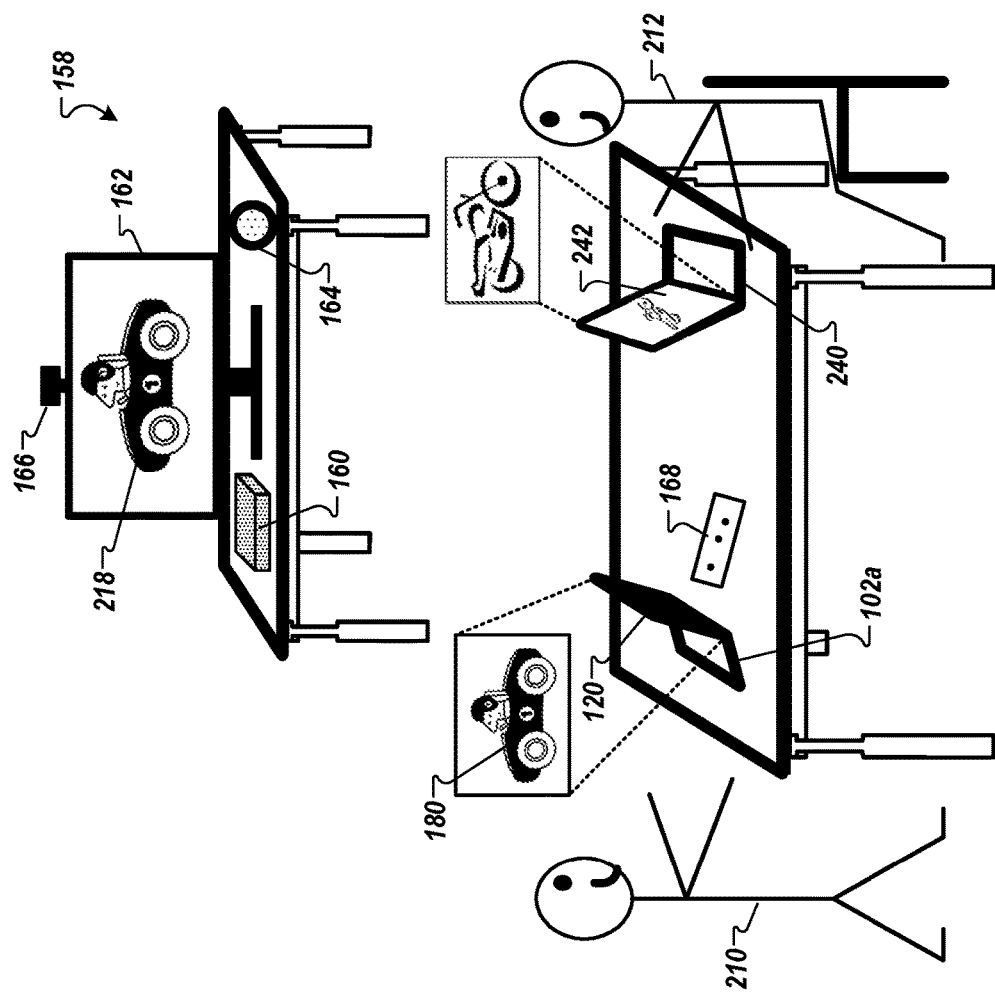
FIG. 2B is a diagram that shows an example videoconference that includes multiple participants.
Figure 2B:
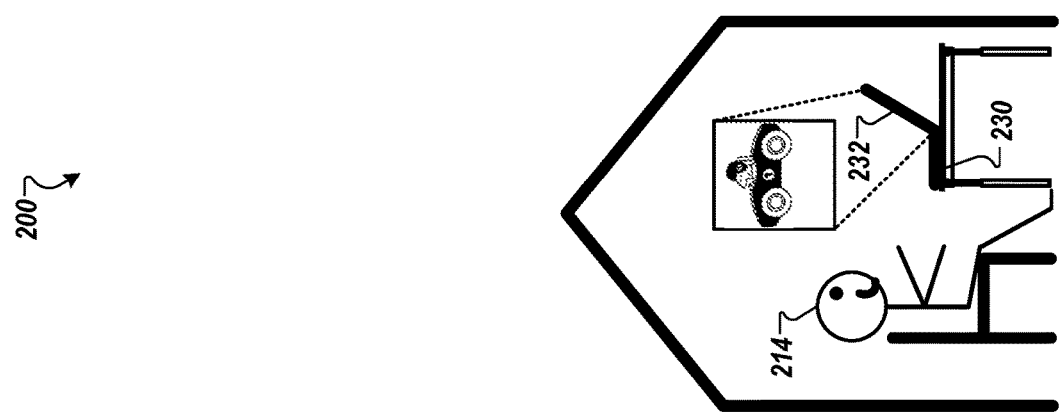

FIG. 2B is a diagram that shows an example videoconference 200 that includes a first participant 210, a second participant 212, and a third participant 214. The videoconference 200 includes the use of the videoconferencing system 158. In the example videoconference 200, the first participant 210 and the second participant 212 are located proximate to the videoconferencing system 158 (e.g., the first participant 210 and the second participant 212 are sitting together in a conference room (e.g., conference room 1900-03L) where the videoconferencing system 158 is located). The third participant 214 is at a location remote from the conference room and the videoconferencing system 158. For example, the third participant 214 can be located in an office outside of the conference room but in the same building as the conference room, the third participant 214 can be located in another building, or the third participant 214 can be working from home.

The first participant 210 can be a user of the computing device 102a as shown in FIGS. 1A, 1B, and 1C. The first participant 210 can be a host or initiator of the videoconference 200. Referring to FIG. 1C, the first participant 210 can select the menu entry 126b in order to provide content displayed on the display device 120 (e.g., the car image 180 displayed in the tab 114a) to the videoconferencing system 158. As described, the menu entry 126b is provided on the pull-down menu 138 based on the detected proximity of the videoconferencing system 158 to the computing device 102a. In response to the selection of the menu entry 126b, the videoconferencing system 158 can display the UI 202 on the display device 162. For example, meeting menu entry 220 indicates that a meeting is scheduled for the conference room (e.g., conference room 1900-03L) at 4:00 pm (in five minutes). The first participant 210 can select the meeting menu entry 220 using, for example, the remote control 168 included in the videoconferencing system 158. Based on the selection of the meeting menu entry 220, the content displayed on the display device 120 (e.g., the car image 180 displayed in the tab 114a) is provided (casted, captured and mirrored) to the videoconferencing device 160 and displayed on the display device 162 as videoconferencing content 218. The first participant 210 has now joined a meeting (e.g., Transportation-Types) scheduled for the conference room (e.g., conference room 1900-03L) and the use of the videoconferencing system 158.

In some implementations, the first participant 210 may choose not to join a scheduled meeting for the conference room. The first participant 210 can select the meeting menu entry 222 using, for example, the remote control 168 included in the videoconferencing system 158. Based on the selection of the meeting menu entry 222, the first participant 210 can start a different or new meeting. The content displayed on the display device 120 (e.g., the car image 180 displayed in the tab 114a) is provided (casted, captured and mirrored) to the videoconferencing device 160 and displayed on the display device 162 as the videoconferencing content 218. The meeting menu entry 220 and the meeting menu entry 222 can be considered identifiers for respective meetings. The first participant 210 can select a cancel entry 224 to exit the UI 202.

In some implementations, a display device (e.g., the display device 120) of a computing device (e.g., the computing device 102a) that is proximate to the videoconferencing system 158 can display a user interface similar to the UI 202. In some cases, the display device 162 may not also display the UI 202. In some cases, the display device 162 may also display the UI 202. In these implementations, the user of the computing device (e.g., the first participant 210) can make meeting selections using the computing device without the need to interact with the videoconferencing system 158, which would necessitate locating and using the remote control 168.

The display device 162 includes an indication of a videoconferencing system name 204. A videoconferencing system can have associated with it a videoconferencing system name that can be permanently assigned to/associated with the videoconferencing system. In some implementations, the videoconferencing system name can be a name for a conference room where the videoconferencing system is located.

The display device 162 includes an indication of a videoconferencing system URL 206. In addition, or in the alternative, a videoconferencing system can have associated with it a videoconferencing system URL. For example, for users/participants in a videoconference that may not be signed into the domain that includes the videoconferencing system 158, the videoconferencing system URL 206 can provide a webpage that the user can access in order to be able to participate in the videoconference. The videoconferencing system URL 206 can provide a mechanism for the user to sign into the domain in order to provide content to the videoconference (allow access to the videoconferencing system 158). In some implementations, referring to the description of "knocking" above, the user may receive a code or password included in the approval message that, if entered into a UI provided by the webpage, allows the user to access and provide content to the videoconference.

Users invited to a meeting (e.g., Transportation-Types) can view the content presented at the meeting by joining the meeting. In some implementations, a user can be signed into the same domain as the videoconferencing system. The user may have a calendar entry for the meeting. Selecting the calendar entry for the meeting can place the user as a participant in the meeting. As a participant, the user can view videoconferencing content. In some implementations, a user can be provided with the videoconferencing system URL 206 that can enable the user to view the content presented at the meeting. One or more additional authentication steps may be needed in order for a user to provide content to the videoconference (e.g., knocking). For example, the third participant 214 can view the videoconferencing content 218 on a display device 232 included in a computing device 230.

The computing device 240 can be determined to be proximate to the videoconferencing system 158 using one or more of the systems and processes described herein. As shown in FIG. 2B, the second participant 212 can have displayed on a display device 242 included in a computing device 240 content different from the videoconferencing content 218. In some cases, though proximate to the videoconferencing system 158, the second participant 212 may not need to or want to provide content to the videoconference. The second participant 212 can be a participant in the videoconference based on the presence of the computing device 240 proximate to the videoconferencing system 158.

Figure 2C:
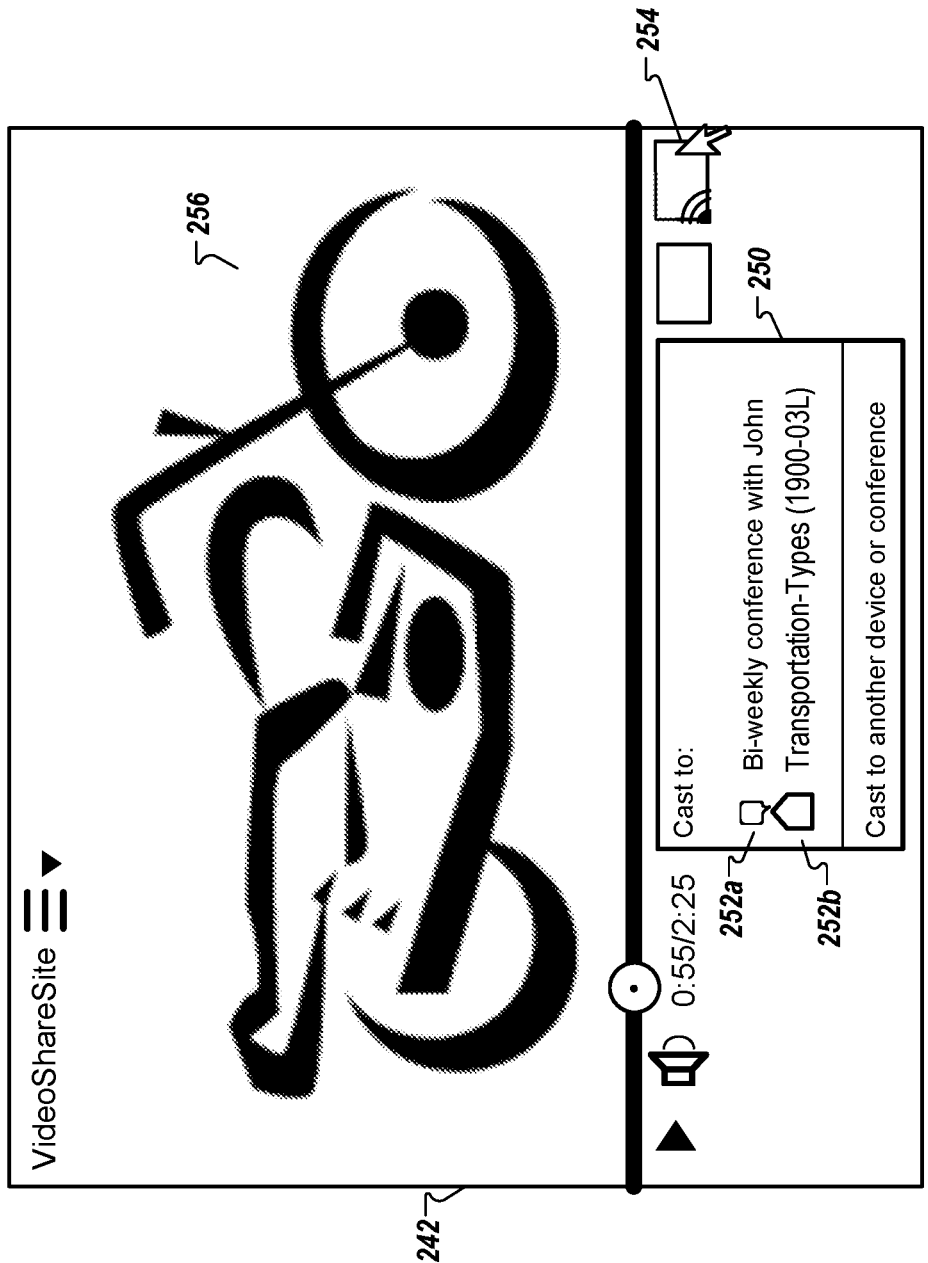
FIG. 2C is a diagram that shows an example of a pop-up menu that can display indications of the information and data determined by discovery APIs and provided by a server to a computing device.

FIG. 2C is a diagram that shows an example of a pop-up menu 250 that can display indications of the information and data determined by, referring to FIG. 1B, the discovery APIs 150 and provided by the server 142a to the computing device 240. Menu entry 252a is indicative of a conference that the second participant 212 may be invited to participate in. Menu entry 252b is indicative of the videoconferencing system 158 that the copresence API 156 has determined is in proximity to the computing device 240. The menu entries 252a-b can be considered identifiers for respective meetings. The second participant 212 can present, provide, cast, or capture and mirror information and data being displayed on the display device 242 (e.g., a motorcycle image 256) to the videoconferencing device 160 based on the detected proximity of the computing device 240 to the videoconferencing system 158 (the videoconferencing device 160). In this example, the second participant may not require pre-authorization to provide content to the videoconference 200.

For example, the second participant 212 is running a videoconferencing-enabled application on the computing device 240. The second participant 212 can select a videoconferencing icon 254. The computing device 240 can display the pop-up menu 250 on the display device 242 in response to the selection of the videoconferencing icon 254. The second participant can select the menu entry 252b to provide the information and data being displayed on the display device 242 (e.g., a motorcycle image 256 (as an example image)) to the videoconferencing device 160 in source form. For example, a URL to the content can be provided/sent to the videoconferencing device 160 as well as the other participants in the videoconference. In some cases, the information and data being displayed on the display device 242 can be different from the content provided/sent to the videoconferencing device 160 as well as the other participants in the videoconference. For example, the content provided/sent to the videoconferencing device 160 as well as the other participants in the videoconference by a back-end server.

Figure 2D:
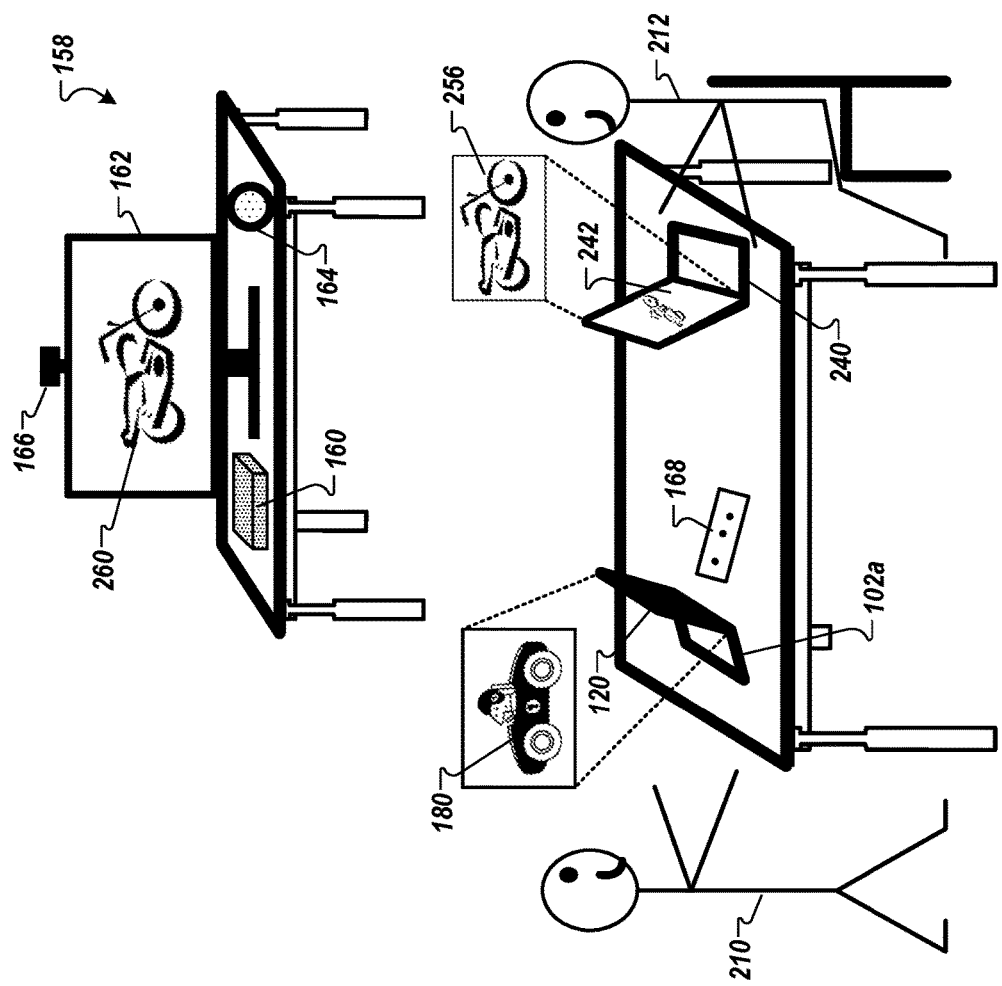
FIG. 2D is a diagram that shows an example videoconference where a second participant can provide videoconferencing content.
Figure 2D:
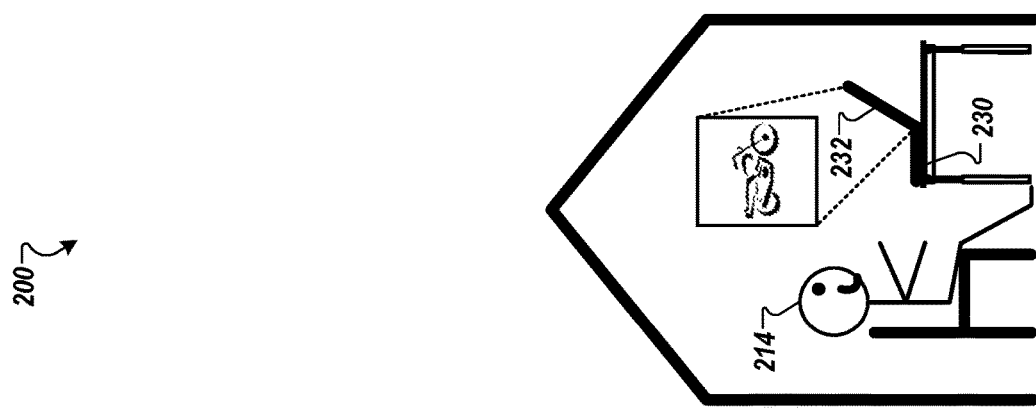

FIG. 2D is a diagram that shows the example videoconference 200 where the second participant 212 provides videoconferencing content 260. The display device 162 can display the videoconferencing content 260 provided, casted, or captured and mirrored by the computing device 240 to the videoconferencing device 160. As shown in FIG. 2D, the display device 120 of the computing device 102a can continue to display the car image 180 in the tab 114a. The third participant 214 now can view the videoconferencing content 260 on the display device 232 of the computing device 230.

In addition, since this does not kick the first participant 210 out of the videoconference, both content items (videoconferencing content 260 and videoconferencing content 218) can be presented in the videoconference. In some implementations, a videoconferencing system can include multiple display devices. In these implementations, the videoconferencing content 218 can be displayed on one display device while the videoconferencing content 260 can be displayed on another display device. In some implementations, a participant in the videoconference may select which videoconference content they would like to view on a display device included in a computing device.

Figure 2E:
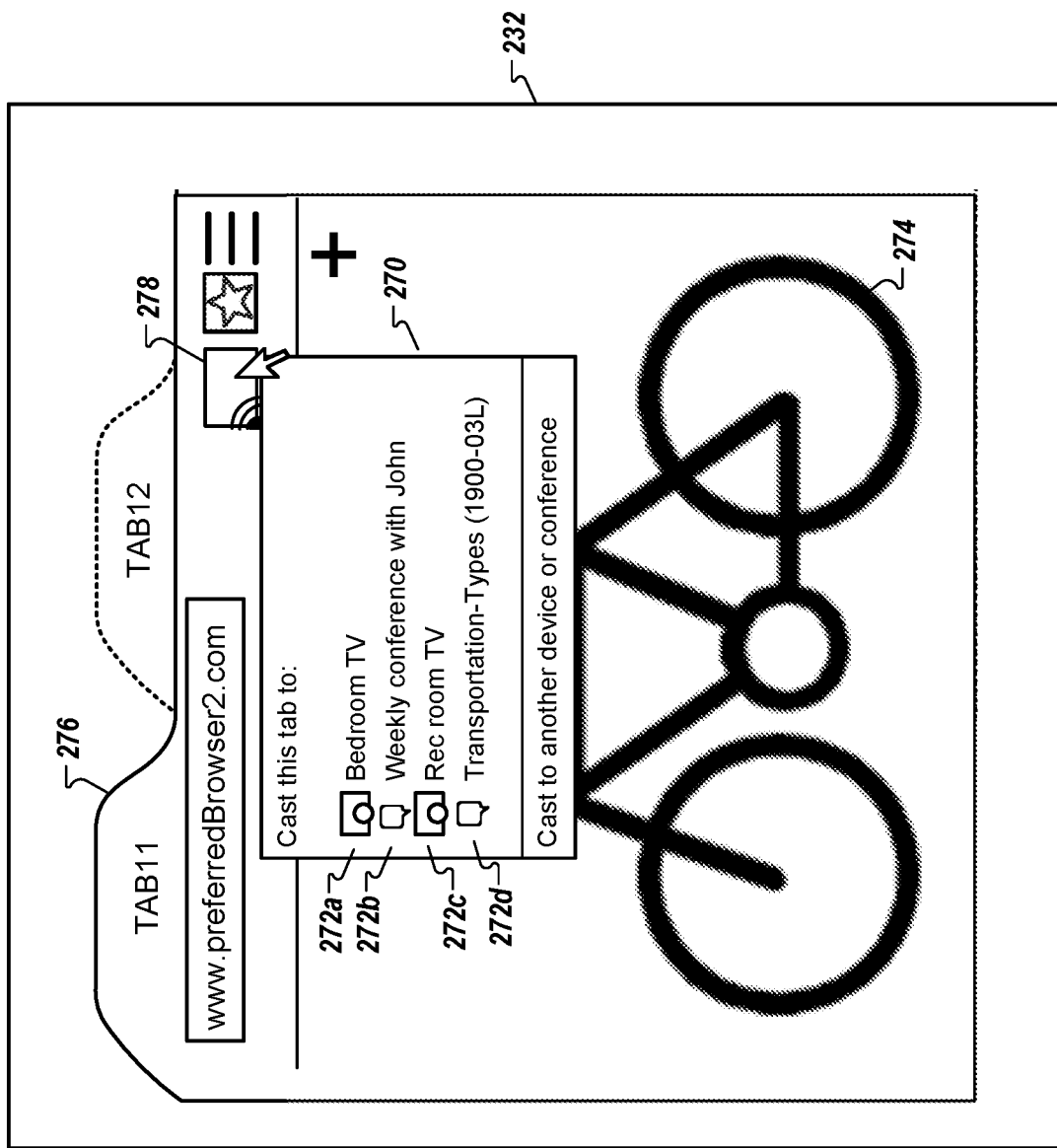
FIG. 2E shows an example of a pull-down menu that can display indications of information and data determined by discovery APIs and provided by a server to a computing device.

FIG. 2E shows an example of a pull-down menu 270 that can display indications of information and data determined by, referring to FIG. 1B, the discovery APIs 150 and provided by the server 142a to the computing device 230. Menu entry 272a and menu entry 272c are indicative of named devices (e.g., a TV located in a bedroom and a TV located in a recreation room) that are on the same network as the computing device 230. In addition, menu entry 272b can be indicative of a conference that the third participant 214 has as an entry on a calendar for the third participant 214. Menu entry 272d is indicative of a videoconference that the third participant 214 has been authenticated/authorized to provide content to as described herein. For example, the menu entry 272d is indicative of the videoconference 200, where the third participant 214 can provide content to the videoconferencing device 160. The menu entry 272b and menu entry 272d can be considered identifiers for respective meetings.

For example, the third participant 214 can be running a browser-based application that displays a bicycle image 274 in a tab 276 of a web browser application. The third participant 214 can select a videoconferencing icon 278. Based on the selection, a videoconference client can project (provide) content to the videoconferencing system 158 while a bicycle image 274 (as an example image) is displayed in a tab 276 of a web browser application. The computing device 230 can present, provide, cast, or capture and mirror the information and data included in the tab 276 (e.g., the bicycle image 274) to the videoconferencing device 160. The videoconferencing system 158 can display the information and data included in the tab 276 (e.g., the bicycle image 274) on the display device 162.

Figure 2F:
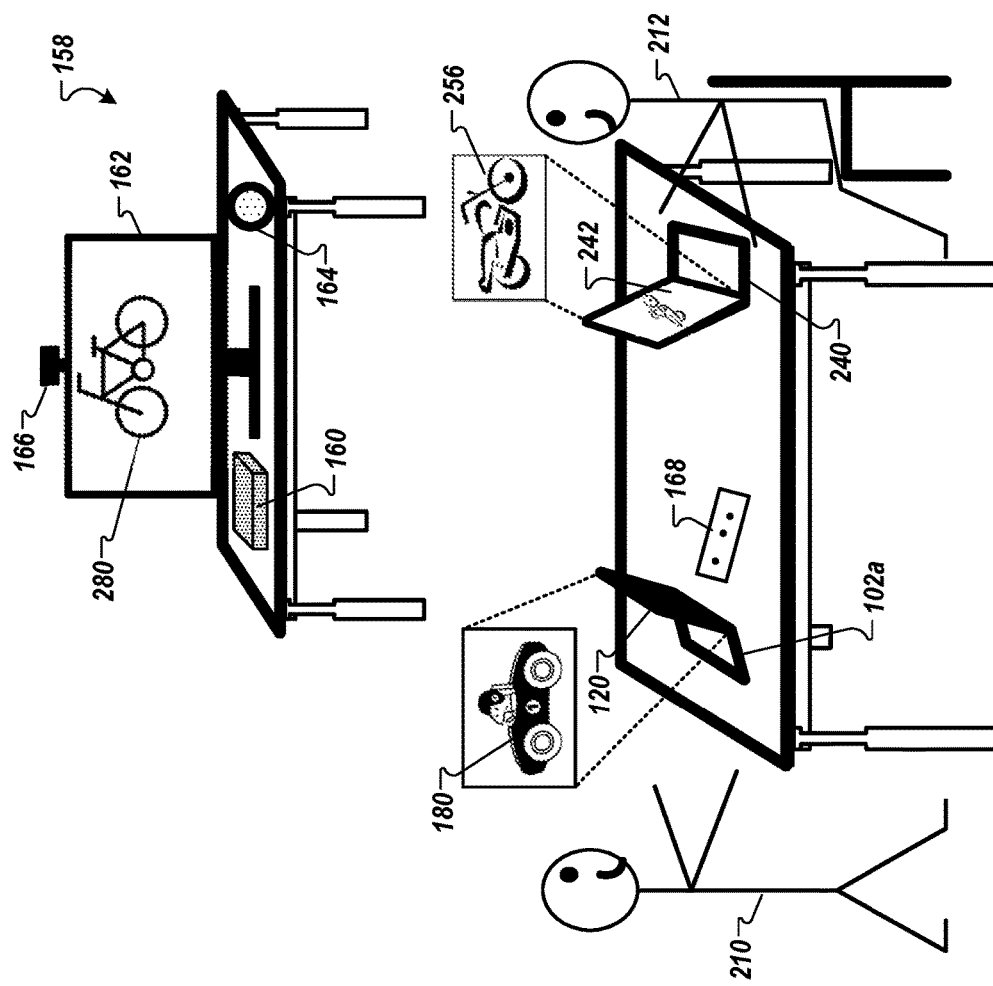
FIG. 2F is a diagram that shows the example videoconference where a third participant can provide videoconferencing content.
Figure 2F:
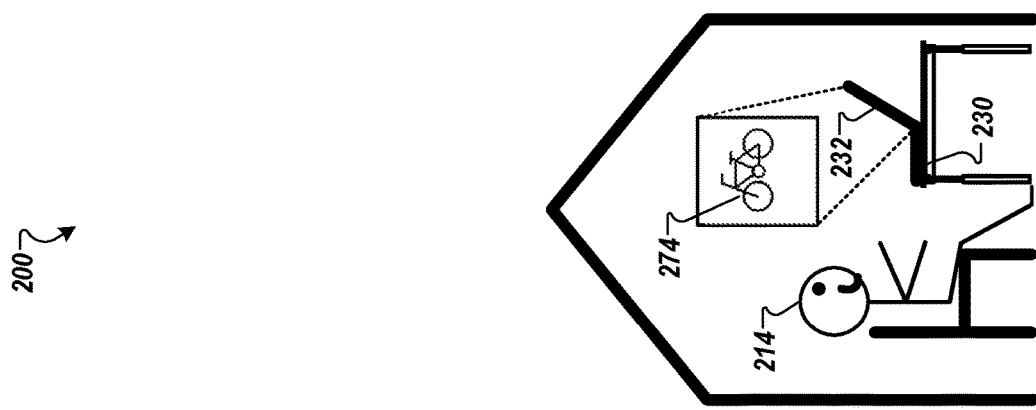

FIG. 2F is a diagram that shows the example videoconference 200 where the third participant 214 provides videoconferencing content 280. The display device 162 can display the videoconferencing content 280 provided (casted, or captured and mirrored) by the computing device 230 to the videoconferencing device 160. As shown in FIG. 2F, the display device 120 of the computing device 102a can continue to display the car image 180 in the tab 114a. The display device 242 of the computing device 240 can continue to display the motorcycle image 256 in the videoconferencing-enabled application.

Figure 2G:
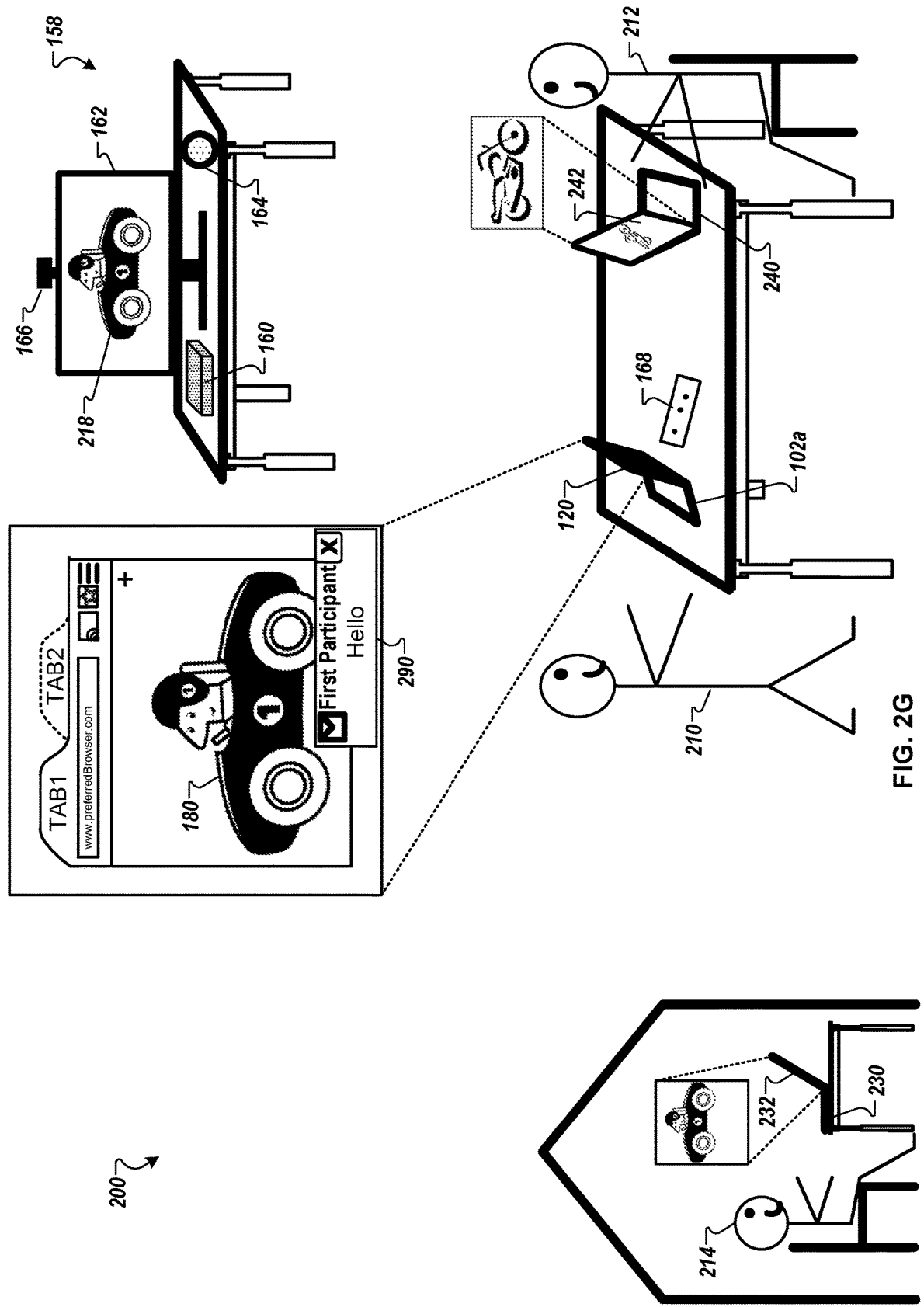
FIG. 2G is a diagram that shows the content displayed on a display device further including an alert window.

FIG. 2G is a diagram that shows the content displayed on the display device 120 (e.g., the car image 180 displayed in the tab 114a) further including an alert window 290. The computing device 102a can display the alert window 290 when, for example, the first participant 210 receives an incoming email or message. As shown in FIG. 2G (and referring to FIG. 2B), the computing device 102a can display the alert window 290 while the computing device 102a is providing (casting, or capturing and mirroring) the information and data included in the tab 114a (e.g., the car image 180). In the example shown in FIG. 2G, the computing device 102a continues to provide the content of the tab 114a (e.g., the car image 180) to the videoconferencing device 160 without including the content of the alert window 290 as part of the content provided to the videoconferencing device 160.

Figure 2H:
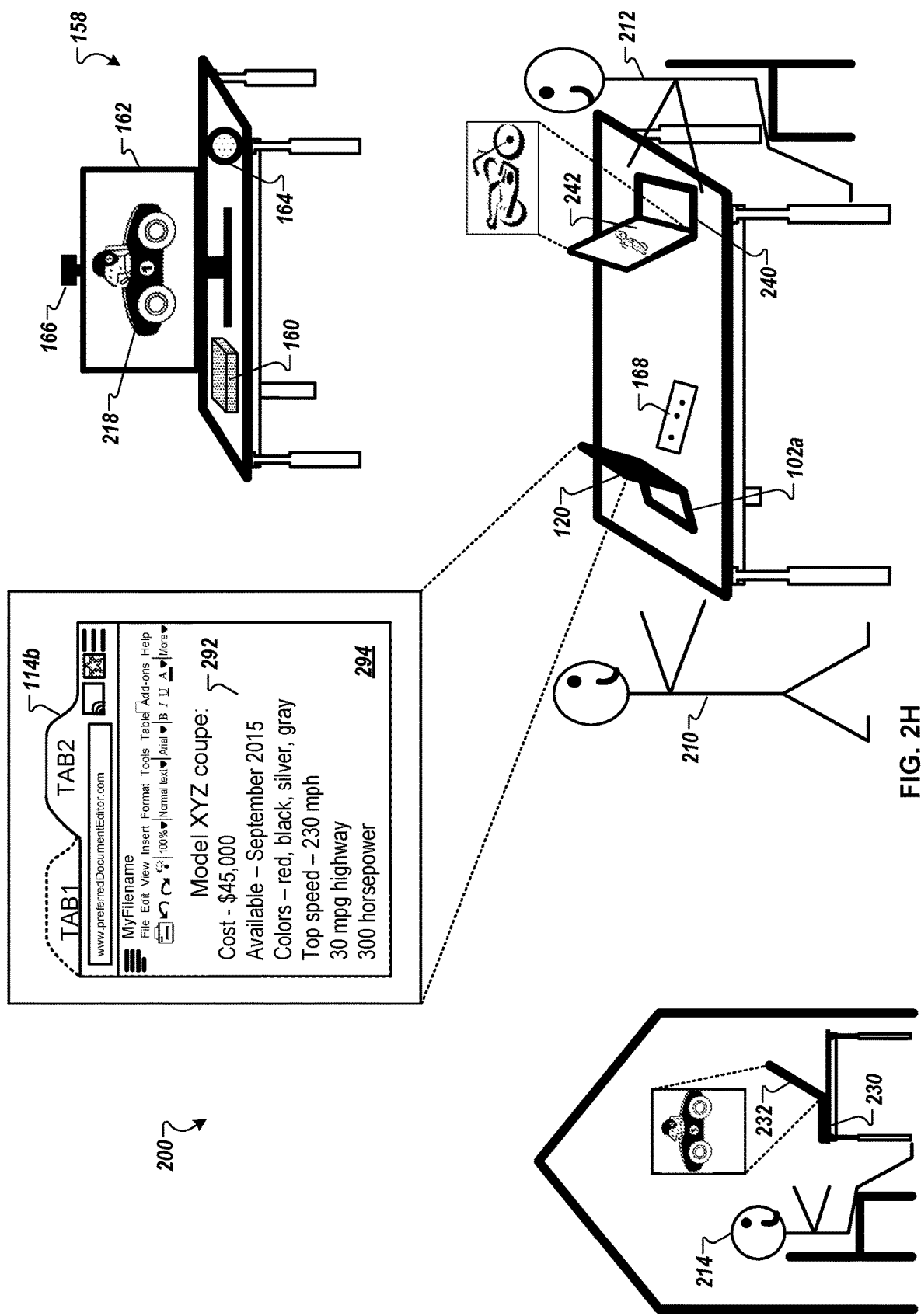
FIG. 2H is a diagram that shows a first participant navigating to/selecting a tab of a web browser application.

FIG. 2H is a diagram that shows the first participant 210, referring to FIG. 1A, navigating to/selecting the tab 114b of the web browser application 110. The first participant 210 can select another tab (e.g., tab 114b) in order to interact with another browser-based application or to view other information and data while the information and data (the contents) displayed in the tab 114a (e.g., the car image 180) remain displayed on the display device 162 included in the videoconferencing system 158. The first participant 210 changing the window or tab that they are currently viewing to view or interact with another tab of the web browser application may not change what is being projected/provided to the display device 162. For example, the first participant 210 may access information and data related to the topic of the videoconference 200 (e.g., car model data 292) from a browser-based application 294 running/executing in the tab 114b of the web browser application 110. In the example shown in FIG. 2H, the computing device 102a continues to provide the content of the tab 114a (e.g., the car image 180) to the videoconferencing device 160 while the first participant 210 navigates to the tab 114b and runs the browser-based application.

The first participant 210 can interact with content included in the tab 114a (e.g., they can provide input to and view output in the tab 114a using the computing device 102a), the interactions being displayed/mirrored on the display device 162 of the videoconferencing system 158. In addition, the first participant 210 can switch/navigate to the tab 114b without providing (casting, or capturing and mirroring) the information and data (the contents) of the tab 114b for viewing on the display device 162. The user can switch from the tab 114a to the tab 114b in the web browser application 110 while the contents of the tab 114a continue to be provided to the videoconferencing device 160 and displayed on the display device 162. The first participant 210 can interact with a browser-based application running/executing in the tab 114b of the web browser application 110 without the contents of the tab 114b and the interactions occurring within the tab 114b being displayed on the display device 162 of the videoconferencing system 158. This can allow the first participant 210 to access/interact with other content without the participants of the videoconference being able to view the other content.

For example, the first participant 210 may display the car model data 292 in the tab 114b for a car whose image is the car image 180 displayed in the tab 114a of the web browser application 110. The first participant 210 can display the car model data 292 while the second participant 212 and the third participant 214 view the videoconferencing content 218. The first participant 210 can access the car model data 292, which may be considered confidential, for use during the videoconference without projecting/providing the car model data 292 to the videoconferencing device 160.

Referring to FIGS. 1C and 2A, the computing device 102a can display the pull-down menu 138 on the display device 120 in response to receiving a selection of the videoconferencing icon 118. The menu entry 126b indicates that the videoconferencing system 158 is in proximity to the computing device 102a. The first participant 210 can select the menu entry 126b. In response to the selection of the menu entry 126b, the videoconferencing system 158 can display the UI 202 on the display device 162. The meeting menu entry 220 indicates that a meeting is scheduled for the conference room (e.g., conference room 1900-03L) at 4:00 pm (in five minutes). In some cases, the first participant 210 can select the meeting menu entry 222. For example, the first participant 210 can select the meeting menu entry 220 using the remote control 168 included in the videoconferencing system 158.

Figure 2I:
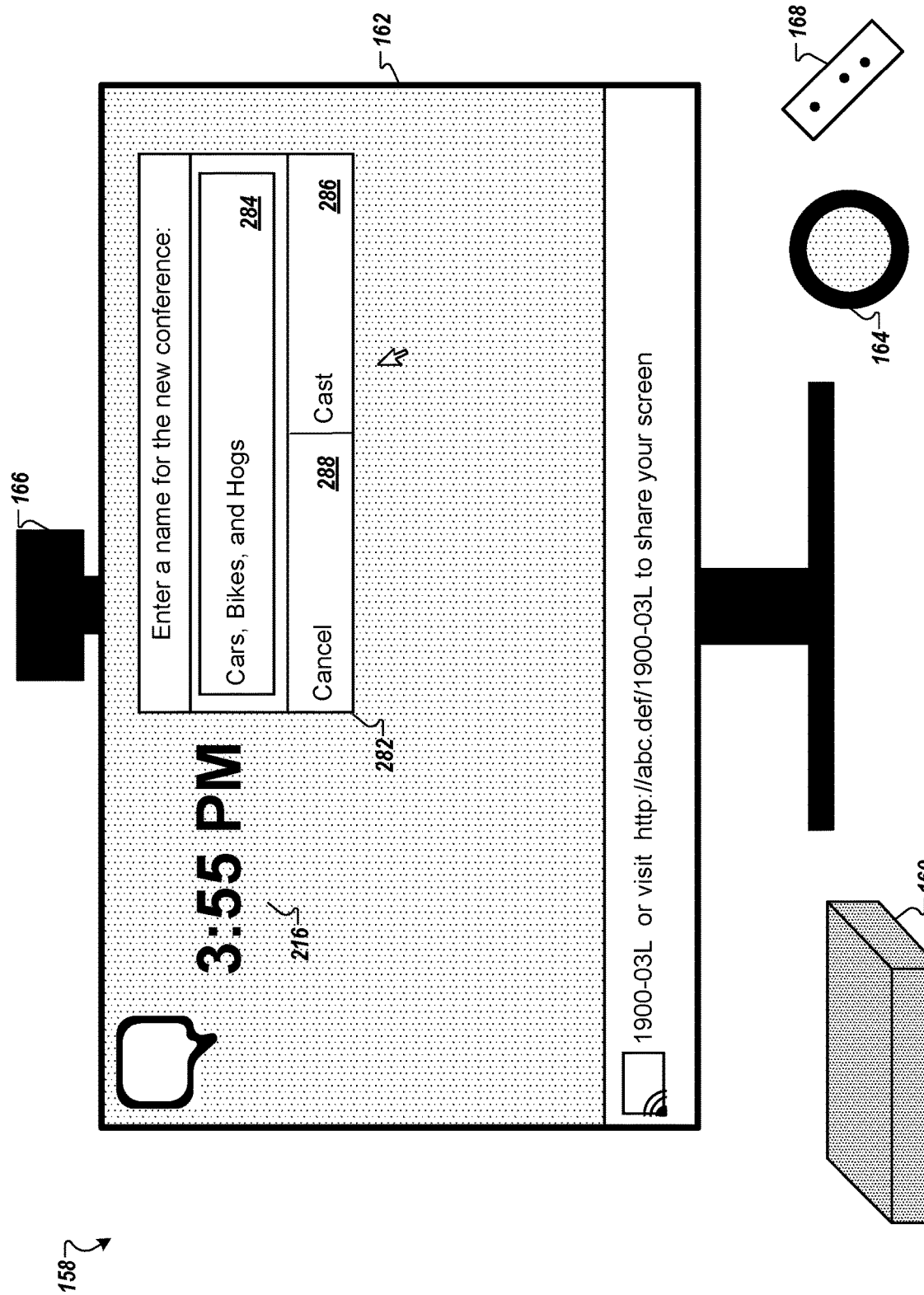
FIG. 2I is a diagram that shows an example user interface displayed on a display device that allows a user to enter a name for a new videoconference.

FIG. 2I is a diagram that shows an example UI 282 displayed on the display device 162 that allows a user to enter a name for a new videoconference. For example, in response to the selection of the meeting menu entry 222 by the first participant 210, the display device 162 can display the UI 282. The first participant can enter a name for the new meeting in the input box 284. In some cases, the meeting name can include/specify a domain (e.g., meeting@domain, domain/meeting). As described herein, users in proximity to the videoconferencing system 158 can automatically join and provide content to the videoconference. As described herein, other users can participate by way of one or more processes that include invitations and knocking.

In some implementations as described herein, the first participant 210 can use a keyboard included on the remote control 168 to enter the meeting name in the input box 284. In other implementations as described herein, the display device (e.g., the display device 120) of a computing device (e.g., the computing device 102a) that is proximate to the videoconferencing system 158 can display a user interface similar to the UI 282. In some cases, the display device 162 may not also display the UI 282. In some cases, the display device 162 may also display the UI 282. In these implementations, the user of the computing device (e.g., the first participant 210) can enter a meeting name using a keyboard or other type on input device included in the computing device without the need to interact with the videoconferencing system 158, which would necessitate locating and using the remote control 168. The first participant 210 can select a cancel menu option 288 to exit the UI 282. The first participant 210 can select a cast menu option 286 to cast content on a computing device of the first participant 210 to the new videoconference.

Figure 3A:
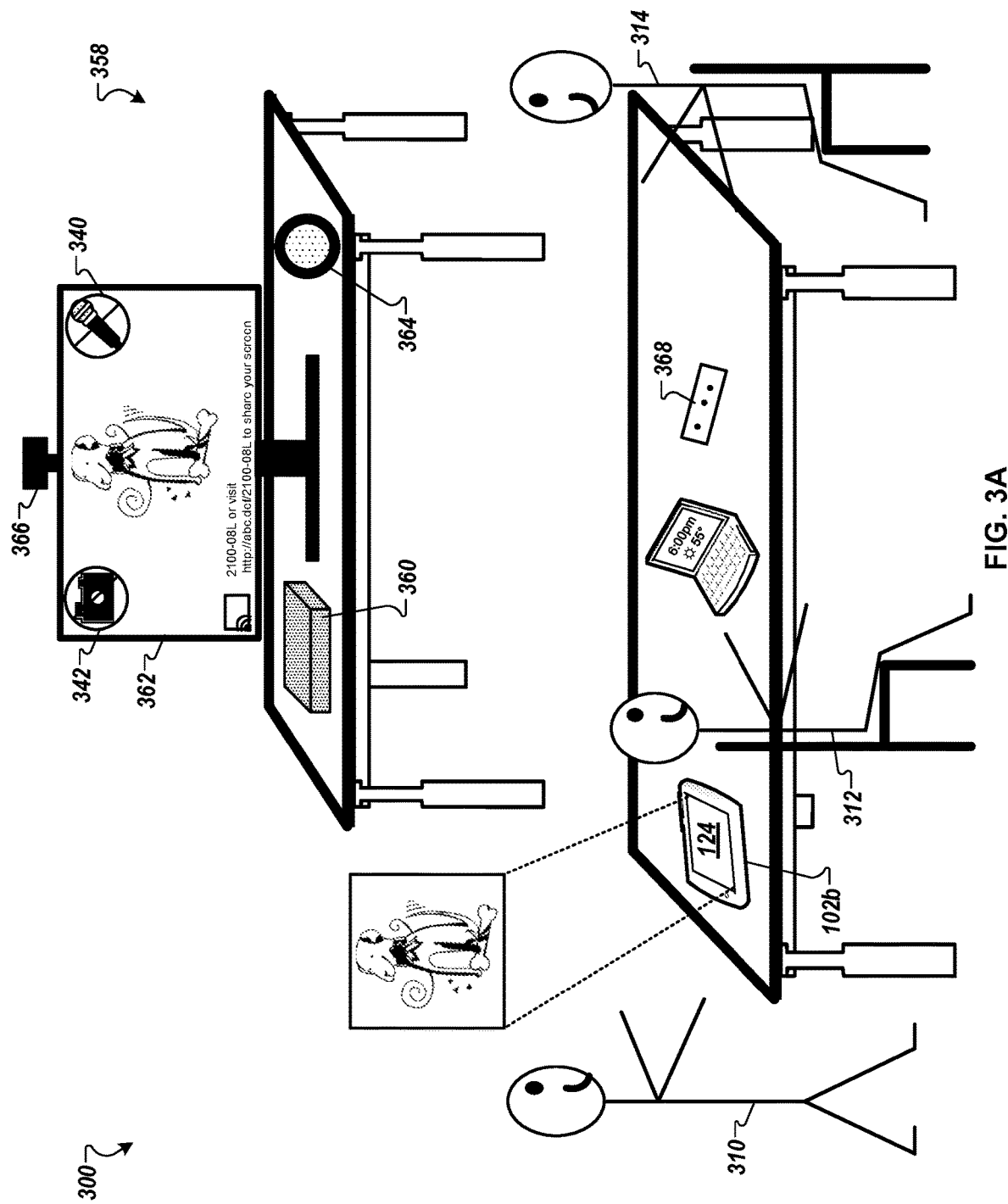
FIG. 3A is a diagram that shows another example videoconference that includes multiple participants.

FIG. 3A is a diagram that shows an example videoconference 300 that includes a first participant 310, a second participant 312, and a third participant 314. In the example videoconference 300, the first participant 310, the second participant 312, and the third participant 314 are located proximate to a videoconferencing system 358 (e.g., the first participant 310, the second participant 312, and the third participant 314 are sitting together in a conference room (e.g., conference room 2100-08L) where the videoconferencing system 358 is located). For example, the first participant 310 can be a user of the computing device 102b as shown in FIGS. 1A, 1B, and 1C. The videoconferencing system 358 can be similar to the videoconferencing system 158. The first participant 310 can be a host or initiator of the videoconference 300. The first participant 310 can enter the conference room with the computing device 102b.

Figure 3B:
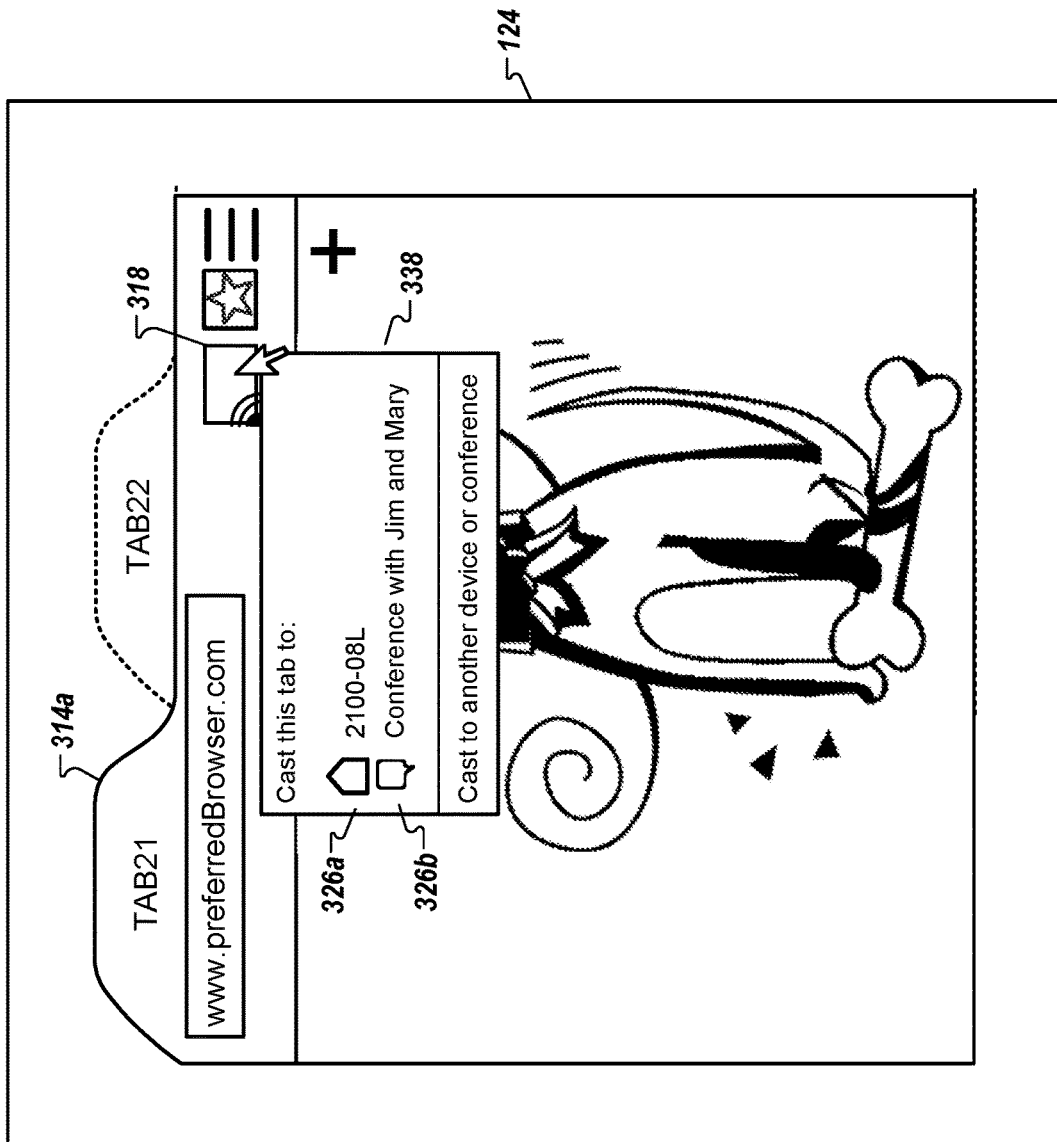
FIG. 3B shows an example of another pull-down menu that can display indications of the information and data determined by discovery APIs 150 and provided by a server 142a to a computing device.

FIG. 3B shows an example of a pull-down menu 338 that can display indications of the information and data determined by, referring to FIGS. 1A and 1B, the discovery APIs 150 and provided by the server 142a to the computing device 102b. In the example shown in FIG. 3B, the computing device 102b can run a web browser application. The computing device 102b can send/provide the information and data (content) displayed in a web browser UI of a particular tab (e.g., tab 314a) to a videoconferencing device 360 for display on a display device 362 included in the videoconferencing system 358. In some implementations, the system UI of the computing device 102b send/provide the information and data (content) to the videoconferencing device 360.

The computing device 102b can display the pull-down menu 338 in the display area 124 in response to receiving a selection of a videoconferencing icon 318. The menu entry 326a indicates that the videoconferencing system 358 is in proximity to the computing device 102b. For example, the menu entry 326a can be a name for the conference room that the videoconferencing system 358 resides in. The first participant 310 can select the menu entry 326a. In cases where there is no meeting scheduled for the conference room and the videoconferencing system residing in the conference room, and where there is no meeting scheduled within a certain time period within a time when the menu entry 326a is selected, the selection of the menu entry 326a can automatically launch/start the videoconference 300 that makes use of the videoconferencing system 358. For example, at 6:00 pm the first participant 310, the second participant 312, and the third participant 314 are sitting together in a conference room (e.g., conference room 2100-08L) where the videoconferencing system 358 is located. The first participant 310 selects the menu entry 326a. A meeting was scheduled for the videoconferencing system 358 in the conference room (e.g., conference room 2100-08L) from 4:00 μm to 5:00 pm but no other meetings are scheduled for the remainder of the day. The selection of the menu entry 326a automatically starts/launches the videoconference 300.

Figure 3C:
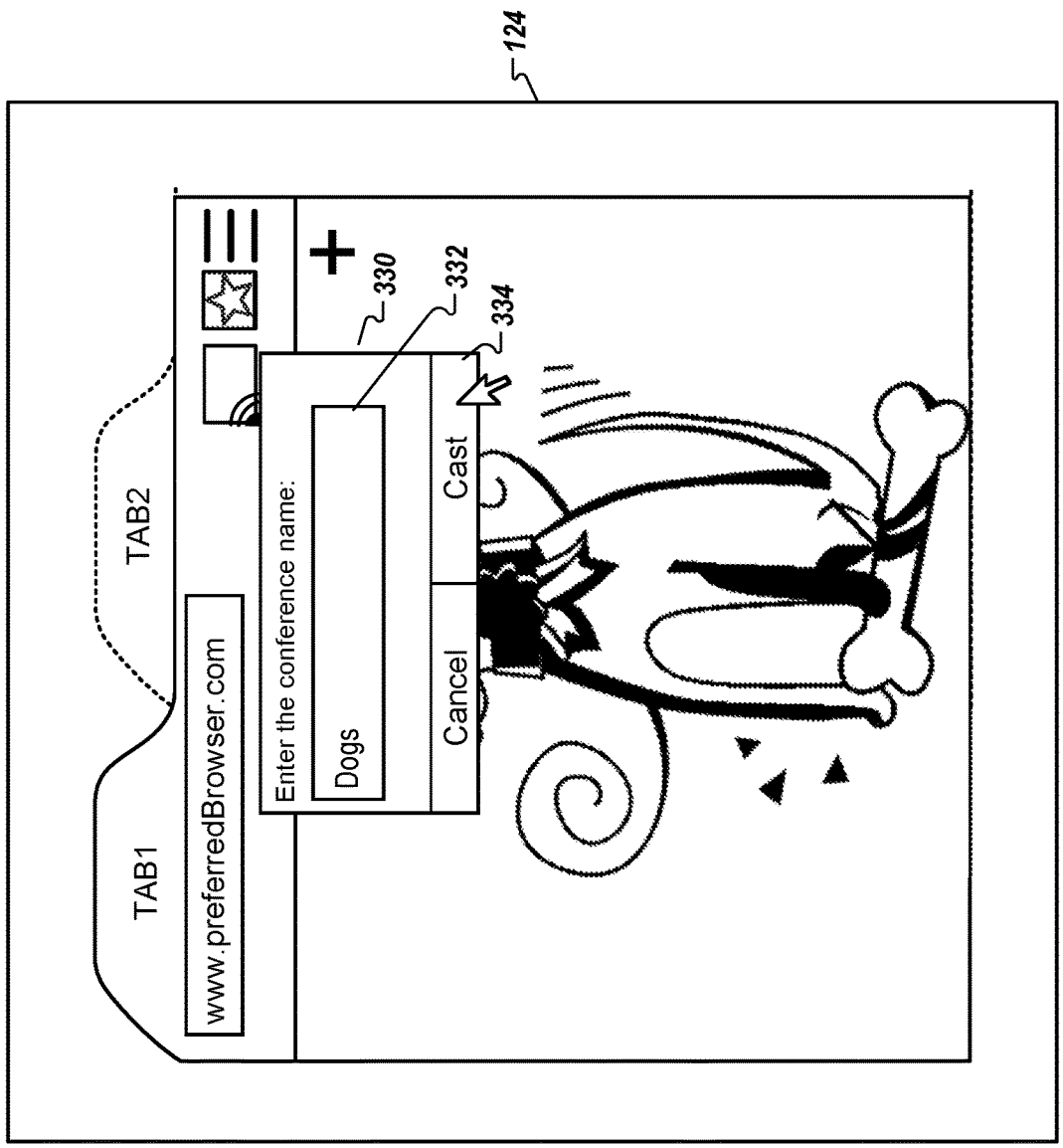
FIG. 3C is a diagram that shows another example user interface displayed in a display area that allows a user to enter a name for a new videoconference.

FIG. 3C is a diagram that shows an example UI 330 displayed in the display area 124 that allows a user to enter a name for a new videoconference. In some implementations, when the selection of the menu entry 326a automatically starts/launches the videoconference 300, the UI 330 can be displayed in the display area 124 to allow the first participant 310 to enter a name for the new videoconference in the input box 332. The first participant 310 can select a cast button 334 to start the videoconference on the videoconferencing system 358. As described herein, users in proximity to the videoconferencing system 358 can automatically join and provide content to the videoconference. As described herein, other users can participate by way of one or more processes that include invitations and knocking.

In some implementations, as described with reference to FIGS. 3A-C, one or more individuals (e.g., the first participant 310, the second participant 312, and the third participant 314) can walk into (enter) a conference room that includes a videoconferencing system (e.g., the videoconferencing system 358) and easily start a videoconference on an idle videoconferencing system (e.g., the videoconferencing system 358). In these implementations, the videoconference can default to having no audio input (e.g., a microphone 364 is muted or not activated) and can default to disabling a camera 366 (e.g., the camera 366 is not activated). The display device 362 can display a microphone indicator 340 with a slash or line through the microphone indicator 340 indicating that the microphone is muted. The display device 362 can display a camera indicator 342 with a slash or line through the camera indicator 342 indicating that the camera is disabled. Muting the microphone 364 and disabling the camera 366 can allow the first participant 310 to just present, provide, cast, or capture and mirror the content of the information and data included in the display area 124. In these implementations, the display device 362 can be used to display/project content to the first participant 310, the second participant 312, and the third participant 314 located in the conference room without creating/allowing the possibility of being able to remotely activate the camera 366 and/or the microphone 364 for the purpose of eavesdropping. The one or more individuals can use a remote control 368 when starting the videoconference on an idle videoconferencing system.

The videoconference can enable audio output. For example, the first participant 310 can share content that includes audio content that everyone in the videoconference can hear. Audio input from the videoconferencing system 358, however, may not be captured if, for example, the videoconference was started from another device (e.g., a device other than the computing device 102b.

In some implementations, data deduplication can prevent (eliminate) duplicate copies of the same meeting from being displayed to a user in a pull-down menu of target conferences and/or devices. For example, referring to FIGS. 1C, 2A, and 2B, the first participant 210 can have the Transportation-Types meeting (the meeting indicated by meeting menu entry 220) on a calendar for the first participant 210. As such, referring to FIG. 1C, in addition to the menu entry 126b indicative of the proximity of the computing device 102a to the videoconferencing system 158, an additional menu entry for the Transportation-Types meeting could also be included in the pull-down menu 138. In this case, the menu entry 126b and the calendar entry for the Transportation-Types meeting are related to the same meeting. In this example, the menu entry 126b indicative of the proximity of the computing device 102a to the videoconferencing system 158 was included in the pull-down menu 138 and an entry for the Transportation-Types meeting was not included. In another example, the menu entry 126b indicative of the proximity of the computing device 102a to the videoconferencing system 158 may not be included in the pull-down menu 138 and an entry for the Transportation-Types meeting may be included.

In one case, a user with a computing device may be proximate to a videoconferencing system and may also have a videoconference scheduled on a calendar for the user at the same time. In this case, since the user cannot be in two different places at the same time, a pull-down menu listing target meetings and videoconferencing devices can list the videoconferencing system higher in the list than the videoconference scheduled on the calendar for the user. For example, referring to FIGS. 1C, 2A, and 2B, the first participant 210 can have a weekly meeting with Katie scheduled on a calendar for the first participant 210 as indicated by menu entry 126c. The weekly meeting with Katie may be scheduled at the same time as the Transportation-Types meeting being held in the conference room 1900-03L. The menu entry 126b is indicative of the proximity of the computing device 102a to the videoconferencing system 158 located in the conference room (conference room 1900-03L) where the Transportation-Types meeting is being held. In this case, the menu entry 126b is placed higher in the list of target meetings and videoconferencing devices than the weekly meeting with Katie.

Figure 4:
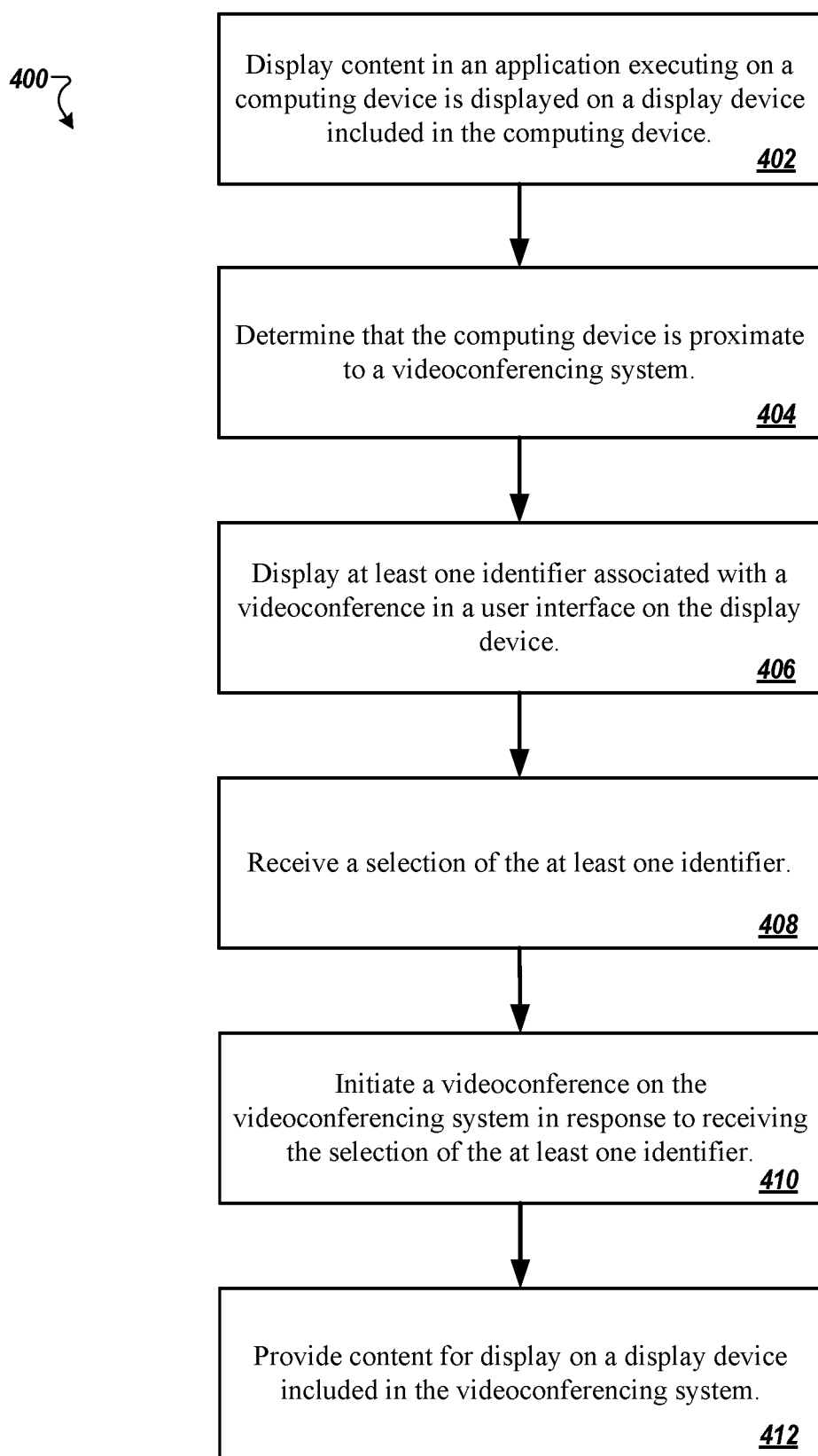
FIG. 4 is a flowchart that illustrates a method of providing content to a videoconference.

FIG. 4 is a flowchart that illustrates a first method 400 of providing content to a videoconference. In some implementations, the systems described herein can implement the method 400. For example, the method 400 can be described referring to FIGS. 1A-C, 2A-I, and 3A-C.

Content in an application executing on a computing device is displayed on a display device included in the computing device (block 402). For example, the user can be running a browser-based application (e.g., the browser-based application 128) that displays the car image 180 in the tab 114a. It is determined that the computing device is proximate to a videoconferencing system (block 404). For example, the copresence API 156 can determine/discover videoconferencing systems proximate to the computing device 102a. The videoconferencing systems in proximity to the computing device can be determined/discovered using one or more of the processes disclosed herein. At least one identifier associated with a videoconference is displayed in a user interface on the display device (block 406). For example, the pull-down menu 138 can display the at least one identifier associated with a videoconference (e.g., menu entry 126b). The at least one identifier can be representative of information and data determined by the discovery APIs 150 and provided by the server 142a to the computing device 102a in response to the remote procedure calls 103. A selection of the at least one identifier is received (block 408). For example, the selection of the menu entry 126b can be received. The videoconference is initiated on the videoconferencing system in response to receiving the selection of the at least one identifier (block 410). Content is provided for display on a display device included in the videoconferencing system (block 412). For example, the content displayed on the display device 120 (e.g., the car image 180 displayed in the tab 114a) is provided (casted, captured and mirrored) to the videoconferencing device 160 and displayed on the display device 162 as videoconferencing content 218.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other.

The computing system can include clients and servers. A client and server are generally remote from each other and can interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   displaying, on a display device of a computing device, content in a web browser application executing on the computing device;
   displaying, in a user interface on the display device, a plurality of menu items, wherein each menu item of the plurality of menu items indicates a named device to which the content is eligible to be cast and is connected with a same local area network as the computing device;
   receiving a selection of a menu item from the plurality of menu items;
   in response to receiving the selection of the menu item, causing the content to be casted to the named device for presentation, wherein:
      the content is included in a first tab of the web browser application that is being displayed on the display device of the computing device; and
      displaying, on the display device of the computing device, other content in a second tab of the web browser application while continuing to provide the content included in the first tab of the web browser application to be casted to the named device for presentation.

2. The method of claim 1, wherein a name for each named device is indicative of a location.

3. The method of claim 1, where at least one of the menu items of the plurality of menu items is indicative of a videoconference.

4. The method of claim 1, wherein the plurality of menu items is displayed in response to selection of a graphical icon on the computing device.

5. The method of claim 1, further comprising determining that the computing device is associated with a videoconferencing system.

6. The method of claim 5, wherein the computing device is located in a room with the videoconferencing system.

7. System comprising:
   a computing device including a hardware processor that:
      displays, on a display device, content in a web browser application executing on the computing device;
      displays, in a user interface on the display device, a plurality of menu items, wherein each menu item of the plurality of menu items indicates a named device to which the content is eligible to be cast and is connected with a same local area network as the computing device;
      receives a selection of a menu item from the plurality of menu items; and
      in response to receiving the selection of the menu item, causes the content to be cast to the named device for presentation, wherein:
         the content is included in a first tab of the web browser application that is being displayed on the display device of the computing device; and
         displays, on the display device, other content in a second tab of the web browser application while continuing to provide the content included in the first tab of the web browser application to be casted to the named device for presentation.

8. The system of claim 7, wherein a name for each named device is indicative of a location.

9. The system of claim 7, where at least one of the menu items of the plurality of menu items is indicative of a videoconference.

10. The system of claim 7, wherein the plurality of menu items is displayed in response to selection of a graphical icon on the computing device.

11. The system of claim 7, wherein the computing device determines that the computing device is associated with a videoconferencing system.

12. The system of claim 11, wherein the computing device is located in a room with the videoconferencing system.

13. A non-transitory computer-readable medium containing computer executable instructions that, when executed by a processor, cause the processor to perform a method, the method comprising:
   displaying, on a display device of a computing device, content in a web browser application executing on the computing device;
   displaying, in a user interface on the display device, a plurality of menu items, wherein each menu item of the plurality of menu items indicates a named device to which the content is eligible to be cast and is connected with a same local area network as the computing device;
   receiving a selection of a menu item from the plurality of menu items; and
   in response to receiving the selection of the menu item, causing the content to be casted to the named device, wherein:
      the content is included in a first tab of the web browser application that is being displayed on the display device of the computing device; and
   displaying, on the display device of the computing device, other content in a second tab of the web browser application while continuing to provide the content included in the first tab of the web browser application to be casted to the named device for presentation.

* * * * *